(12) United States Patent
Tanaka et al.

(10) Patent No.: US 11,007,975 B2
(45) Date of Patent: May 18, 2021

(54) WEBBING RETRACTOR

(71) Applicant: KABUSHIKI KAISHA TOKAI-RIKA-DENKI-SEISAKUSHO, Aichi (JP)

(72) Inventors: Takahiro Tanaka, Aichi (JP); Wataru Yanagawa, Aichi (JP); Shinichi Okubo, Aichi (JP); Yuji Suga, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 16/634,293

(22) PCT Filed: Jun. 22, 2018

(86) PCT No.: PCT/JP2018/023889
§ 371 (c)(1),
(2) Date: Jan. 27, 2020

(87) PCT Pub. No.: WO2019/026463
PCT Pub. Date: Feb. 7, 2019

(65) Prior Publication Data
US 2020/0231115 A1 Jul. 23, 2020

(30) Foreign Application Priority Data

Aug. 3, 2017 (JP) .............................. JP2017-150957

(51) Int. Cl.
*B60R 22/46* (2006.01)
(52) U.S. Cl.
CPC ...... *B60R 22/4604* (2013.01); *B60R 22/4676* (2013.01)

(58) Field of Classification Search
CPC . B60R 22/4676; B60R 22/46; B60R 22/4604; B60R 2022/4647
See application file for complete search history.

(56) References Cited

U.S. PATENT DOCUMENTS 6,419,176 B1 * 7/2002 Mizuno ............... B60R 22/4628
242/374
9,744,940 B1 * 8/2017 Kohlndorfer ....... B60R 22/4628
(Continued)

FOREIGN PATENT DOCUMENTS

JP 2014-500178 A 1/2014
JP 2017-100684 A 6/2017

OTHER PUBLICATIONS

Hisashi Yanagawa, Webbing Winder, EPO, JP 2017-100684 A, English Abstract (Year: 2017).*
(Continued)

*Primary Examiner* — James A English
(74) *Attorney, Agent, or Firm* — Roberts Calderon Safran & Cole P.C.

(57) ABSTRACT

In a webbing retractor, due to a moving member being moved toward an axial direction distal end side, and first teeth and second teeth of a rotating member piercing the moving member, the rotating member is rotated in a take-up direction. Here, at the moving member, a sectional surface area, in a direction orthogonal to an axis, of a small diameter portion that is at an axial direction distal end side is made to be small as compared with a moving member main body that is at an axial direction proximal end side. Therefore, resistance to movement of the moving member can be reduced.

13 Claims, 15 Drawing Sheets

(56) References Cited

U.S. PATENT DOCUMENTS

| | | | |
|---|---|---|---|
| 10,011,246 B2* | 7/2018 | Landbeck | B60R 22/4628 |
| 10,259,426 B2* | 4/2019 | Kohlndorfer | B60R 22/4628 |
| 10,308,214 B2* | 6/2019 | Asako | B60R 22/46 |
| 10,328,895 B2* | 6/2019 | Kohlndorfer | B60R 22/4628 |
| 10,369,963 B2* | 8/2019 | Kohlndorfer | B60R 22/4628 |
| 2011/0140502 A1* | 6/2011 | Shiotani | B60R 22/4633 |
| | | | 297/475 |
| 2014/0014758 A1* | 1/2014 | Gentner | B60R 22/4628 |
| | | | 242/389 |
| 2014/0145020 A1 | 5/2014 | Gentner et al. | |
| 2015/0274122 A1* | 10/2015 | Yanagawa | B60R 22/44 |
| | | | 242/379.1 |
| 2015/0336538 A1* | 11/2015 | Gray | B60R 22/4628 |
| | | | 242/389 |
| 2019/0111888 A1* | 4/2019 | Daeuber | B60R 22/4633 |
| 2019/0210557 A1* | 7/2019 | Modinger | B60R 22/4628 |

OTHER PUBLICATIONS

Hisashi Yanagawa, Webbing Winder, EPO, JP 2017-100684 A, Machine Translation of Description (Year: 2017).*

* cited by examiner

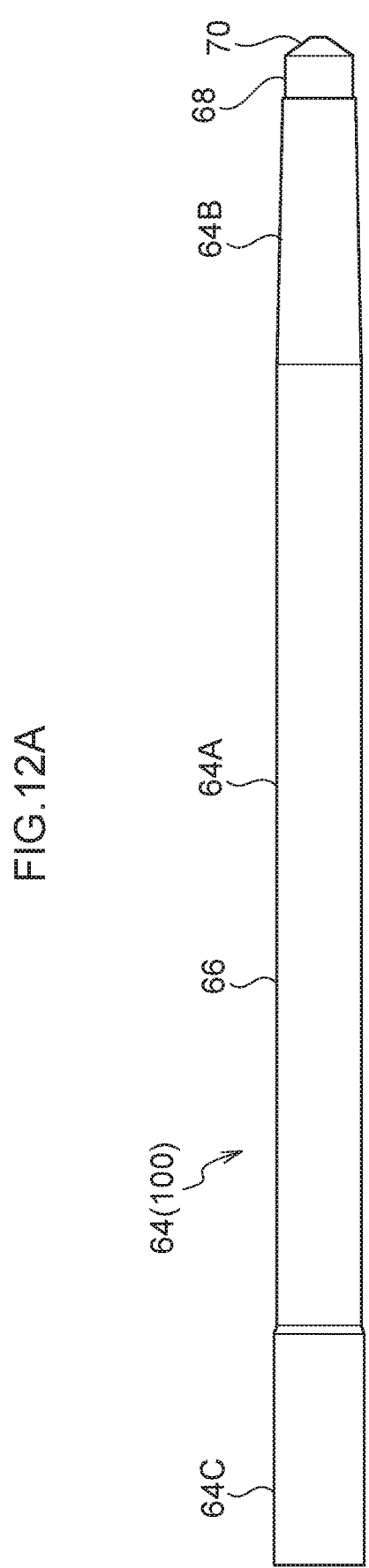

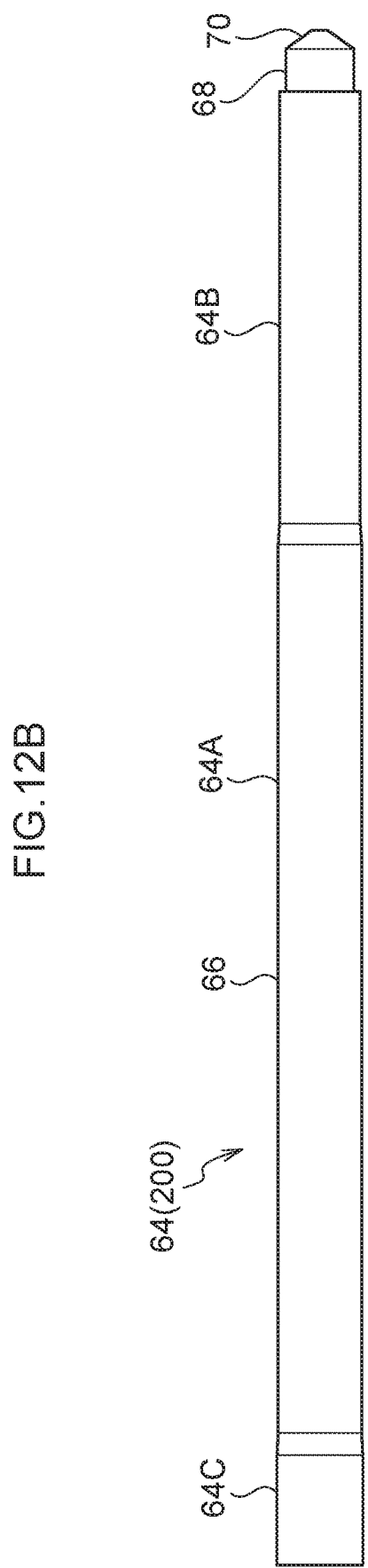

WEBBING RETRACTOR

CROSS-REFERENCE TO RELATED APPLICATIONS

The present application is a U.S. National Phase of PCT/JP2018/023889 filed on Jun. 22, 2018, claiming priority under 35 USC 119 from Japanese Patent Application No. 2017-150957 filed Aug. 3, 2017, the disclosure of which is incorporated by reference herein.

TECHNICAL FIELD

The present invention relates to a webbing retractor in which a rotating member is rotated toward one side such that a spool is rotated in a take-up direction.

BACKGROUND ART

In the belt retractor disclosed in Japanese Patent Application Laid-Open (JP-A) No. 2014-500178, a force transmitting element is moved toward an axial direction distal end side, and teeth of a driving wheel bite into the force transmitting element. Due thereto, the force transmitting element rotates the driving wheel in a take-up direction, and a belt reel is rotated in the take-up direction.

Here, in such a belt retractor, it is preferable to be able to reduce the resistance to the movement of the force transmitting element.

SUMMARY OF INVENTION

Technical Problem

In view of the above-described circumstances, an object of the present invention is to provide a webbing retractor that can reduce the resistance to movement of a moving member.

Solution to Problem

A webbing retractor of a first aspect of the present invention comprises: a spool that is rotated in a take-up direction, and on which a webbing of a seatbelt device is taken up; a rotating member at which bite-in portion is provided, and that is rotated toward one side such that the spool is rotated in the take-up direction; a moving member that, by being moved toward an axial direction distal end side and the bite-in portion biting thereinto, rotates the rotating member toward the one side; and a pierced portion that is provided at the moving member, that the bite-in portion pierces such that the rotating member is rotated toward the one side, and at which a sectional surface area, in a direction orthogonal to an axis, of an axial direction distal end side portion is made to be small as compared with an axial direction proximal end side portion.

A webbing retractor of a second aspect of the present invention comprises, in the webbing retractor of the first aspect of the present invention, a narrow portion that is provided at an axial direction distal end portion of the moving member, and whose sectional surface area, in a direction orthogonal to an axis, is made to be small as compared with an axial direction proximal end side portion of the moving member, and a side surface of the narrow portion running along an axial direction of the moving member.

A webbing retractor of a third aspect of the present invention comprises, in the webbing retractor of the first aspect of the present invention, a narrow portion that is provided at an axial direction distal end portion of the moving member, and at which are provided a first portion, whose sectional surface area, in a direction orthogonal to an axis, is made to be small as compared with an axial direction proximal end side portion of the moving member, and, at an axial direction distal end side of the first portion, a second portion whose sectional surface area, in a direction orthogonal to an axis, is made to be small as compared with the first portion.

Advantageous Effects of Invention

In the webbing retractor of the first aspect of the present invention, due to the moving member being moved toward the axial direction distal end side, and the bite-in portion of the rotating member biting into the moving member, the moving member rotates the rotating member toward one side such that the spool is rotated in the take-up direction. Therefore, the webbing of the seatbelt device is taken up onto the spool. Further, the bite-in portion pierces the pierced portion of the moving member such that the rotating member is rotated toward one side.

Here, the sectional surface area, in the direction orthogonal to the axis, of the axial direction distal end side portion of the pierced portion is made to be small as compared with the axial direction proximal end side portion of the pierced portion. Therefore, resistance to movement of the moving member can be reduced.

In the webbing retractors of the second aspect and the third aspect of the present invention, the narrow portion is provided at the axial direction distal end portion of the moving member. The sectional surface area, in the direction orthogonal to the axis, of the narrow portion is made to be small as compared with the axial direction proximal end side portion of the moving member. Therefore, at the time when movement of the moving member toward the axial direction distal end side is started, the collision load from the axial direction distal end portion of the moving member to the bite-in portion of the rotating member can be reduced.

BRIEF DESCRIPTION OF DRAWINGS

FIG. 12A is a side view of the moving member at a webbing retractor relating to a second embodiment of the present invention.

FIG. 12B is a side view of the moving member at a webbing retractor relating to a third embodiment of the present invention.

DESCRIPTION OF EMBODIMENTS

First Embodiment

A first embodiment of the present invention is described next on the basis of the respective drawings of FIG. 1 through FIG. 11. Note that, in the respective drawings, arrow FR indicates the front side of a vehicle to which a present webbing retractor 10 is applied, arrow OUT indicates a vehicle transverse direction outer side, and arrow UP indicates the vehicle upper side. Further, in the respective drawings, arrow A indicates a take-up direction that is the rotating direction of a spool 18 at the time when the spool 18 takes up a webbing 20, and arrow B indicates a pull-out direction that is opposite the take-up direction. Moreover, arrow C indicates a length direction distal end side of a stopper 92 that serves as a first expansion suppressor and structures an expansion suppressor.

Structure of Present Embodiment

Figure 1:
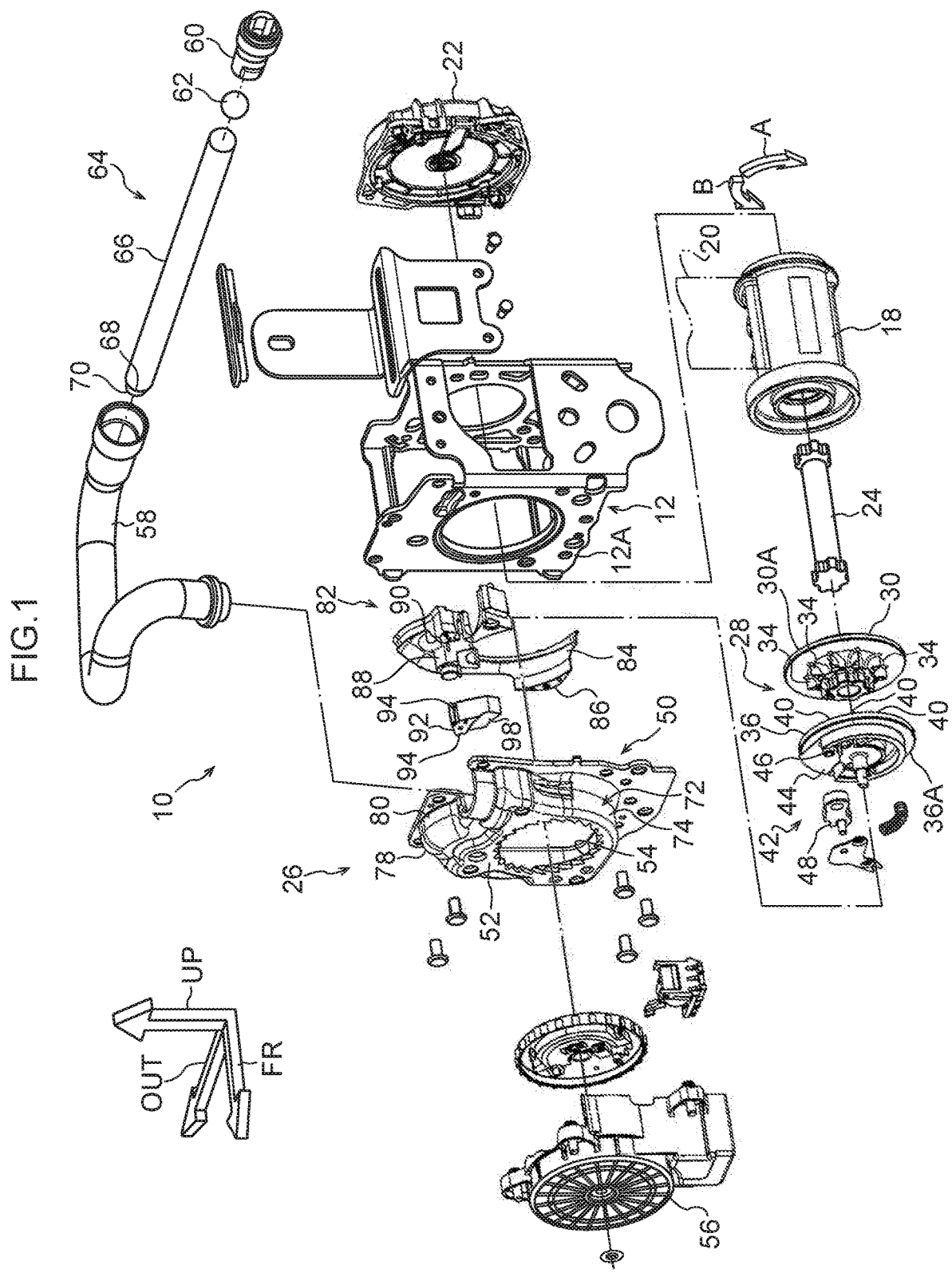
FIG. 1 is an exploded perspective view of a webbing retractor relating to a first embodiment of the present invention.

As shown in FIG. 1, the webbing retractor 10 relating to the present embodiment has a frame 12. The frame 12 is fixed to a vehicle lower side portion of a center pillar (not illustrated) that serves as the vehicle body of the vehicle.

Further, the spool 18 is provided at the frame 12. The spool 18 is formed in a substantially cylindrical tubular shape, and can rotate around the central axis thereof (in the arrow A direction and the arrow B direction in FIG. 1). The length direction proximal end portion of the webbing 20 that is shaped as an elongated belt is anchored on the spool 18. When the spool 18 is rotated in the take-up direction (the arrow A direction in FIG. 1 and the like), the webbing 20 is taken up, from the length direction proximal end side thereof, onto the spool 18. Further, the length direction distal end side of the webbing 20 extends from the spool 18 toward the vehicle upper side, and passes-through a slit hole that is formed in a through-anchor (not illustrated), which is supported at the center pillar at the vehicle upper side of the frame 12, and is folded-over toward the vehicle lower side.

Moreover, the length direction distal end portion of the webbing 20 is anchored on an anchor plate (not illustrated).

The anchor plate is formed from a metal plate member of iron or the like, and is fixed to the floor portion (not illustrated) of the vehicle or to a frame member of a seat (not illustrated) that corresponds to the present webbing retractor 10, or the like.

Further, a seatbelt device for a vehicle, to which the present webbing retractor 10 is applied, has a buckle device (not illustrated). The buckle device is provided at the vehicle transverse direction inner side of the seat (not illustrated) to which the present webbing retractor 10 is applied. The webbing 20 is applied to the body of a passenger due to a tongue (not illustrated), which is provided at the webbing 20, being engaged with the buckle device in a state in which the webbing 20 is placed around the body of the passenger who is seated in the seat.

Further, as shown in FIG. 1, a spring housing 22 is provided at the vehicle rear side of the frame 12. A spool urger (not illustrated) such as a spiral spring or the like is provided at the inner side of the spring housing 22. The spool urger is engaged with the spool 18 directly or indirectly, and the spool 18 is urged in the take-up direction (the arrow A direction in FIG. 1) by the urging force of the spool urger.

Moreover, the present webbing retractor 10 has a torsion bar 24 that structures a force limiter mechanism. The vehicle rear side portion of the torsion bar 24 is disposed at the inner side of the spool 18, and is connected to the spool 18 in a state in which relative rotation with respect to the spool 18 is limited. In contrast, the vehicle front side portion of the torsion bar 24 passes-through a hole formed in the frame 12, and extends to the outer side (the vehicle front side) of the frame 12.

A rotating member 28 of a pretensioner 26 is provided at the vehicle front side of the frame 12. The rotating member 28 has a first rotating portion 30. The first rotating portion 30 is disposed coaxially with the spool 18. A first facing plate 30A, which is substantially disc-shaped and serves as a facing portion, is provided at the first rotating portion 30, coaxially therewith. The vehicle front side portion of the torsion bar 24 is connected to the first rotating portion 30. Relative rotation, with respect to the vehicle front side portion of the torsion bar 24, of the rotating member 28 is limited. Further, the first rotating portion 30 of the rotating member 28 has, at the vehicle front side and the inner side of the first facing plate 30A, plural first teeth 34 that serve as bite-in portions. These first teeth 34 are formed at a predetermined interval around the central axis of the first rotating portion 30.

Moreover, a second rotating portion 36 that, together with the first rotating portion 30, structures the rotating member 28, is provided at the vehicle front side of the first rotating portion 30, coaxially therewith. A second facing plate 36A, which is substantially disc-shaped and serves as a facing portion, is provided at the second rotating portion 36, coaxially therewith. The second facing plate 36A faces the first facing plate 30A of the first rotating portion 30 in the axial direction of the spool 18. The second rotating portion 36 has, at the vehicle rear side and the inner side of the second facing plate 36A, plural second teeth 40 that serve as bite-in portions. These second teeth 40 are formed at a predetermined interval around the central axis of the second rotating portion 36. As seen from the central axis direction of the rotating member 28, the respective second teeth 40 are disposed at the substantial centers of the regions between the first teeth 34 of the first rotating portion 30 that are adjacent to one another around the central axis of the first rotating portion 30 of the rotating member 28. In this state, the second rotating portion 36 is connected to the first rotating portion 30, and relative movement of the second rotating portion 36 with respect to the first rotating portion 30 is limited.

Further, the vehicle front side portion of the second rotating portion 36 is made to be a lock base 44 of a locking mechanism 42. The lock base 44 has a lock pawl 48. The lock pawl 48 is supported by a boss 46 that is formed at the lock base 44, and can rotate around the boss 46.

On the other hand, a cover plate 50 that structures both the locking mechanism 42 and the pretensioner 26 is fixed to a leg plate 12A that is at the vehicle front side of the frame 12. The cover plate 50 opens toward the vehicle rear side. A bottom plate 52 of the cover plate 50 faces the frame 12 in a state of being apart from the frame 12 toward the vehicle front side. The first facing plate 30A of the first rotating portion 30 of the rotating member 28 can abut the leg plate 12A, and the second facing plate 36A of the second rotating portion 36 of the rotating member 28 can abut the bottom plate 52, and the rotating member 28 can be displaced in the axial direction between the leg plate 12A and the bottom plate 52 (see FIG. 11).

A ratchet hole 54 is formed in the bottom plate 52, and ratchet teeth are formed at the inner peripheral portion of the ratchet hole 54. When the lock pawl 48 of the lock base 44 is rotated one way around the boss 46, the distal end portion of the lock pawl 48 meshes-together with a ratchet tooth of the ratchet hole 54. Due thereto, rotation of the lock base 44 in the pull-out direction (the arrow B direction in FIG. 1 and the like) is limited, and rotation of the spool 18 in the pull-out direction is limited indirectly.

Further, a sensor holder 56 of the locking mechanism 42 is provided at the vehicle front side of the cover plate 50. The sensor holder 56 opens toward the vehicle rear side, and is fixed to the frame 12 directly or indirectly via the cover plate 50. Respective parts, which structure a sensor mechanism that detects an emergency state of the vehicle, are housed at the inner side of the sensor holder 56. When the sensor mechanism within the sensor holder 56 is operated at the time of an emergency of the vehicle, interlockingly with the rotation of the lock base 44 of the locking mechanism 42 in the pull-out direction, the lock pawl 48 of the lock base 44 is rotated one way around the boss 46.

On the other hand, the webbing retractor 10 has a cylinder 58 that serves as a tubular member (a guiding member) and structures the pretensioner 26. The cylinder 58 is formed in the shape of a cylindrical tube, and the inner diameter dimension of the cylinder 58 is made to be slightly large as compared with the gap dimension (the dimension in the axial direction of the rotating member 28) between the first facing plate 30A and the second facing plate 36A of the rotating member 28. The axial direction proximal end portion of the cylinder 58 is disposed at the vehicle rear upper side of the frame 12. A micro gas generator 60 (hereinafter the micro gas generator 60 is called the "MGG 60") that serves as a fluid supplier is inserted in the axial direction proximal end portion of the cylinder 58. The MGG 60 is, via an ECU that serves as a controller, electrically connected to a collision sensing sensor that is provided at the vehicle (neither of which is illustrated). When impact at the time of a vehicle collision is sensed by the collision sensing sensor, the MGG 60 is operated by the ECU, and gas, which is one form of a fluid and is generated at the MGG 60, is supplied to the inner side of the cylinder 58.

A sealing ball 62 that serves as a piston is disposed at the inner side of the cylinder 58 of the pretensioner 26. The sealing ball 62 is formed from a synthetic resin material. The shape of the sealing ball 62 in the state in which load is not being imparted to the sealing ball 62 is substantially spherical. The internal space of the cylinder 58 is partitioned by the sealing ball 62 into a region that is further toward the axial direction proximal end side than the sealing ball 62 and a region that is further toward the axial direction distal end side than the sealing ball 62. When the MGG 60 is operated, gas that is generated at the MGG 60 is supplied to between the MGG 60 and the sealing ball 62 at the cylinder 58. When, due thereto, the internal pressure is raised between the MGG 60 and the sealing ball 62 at the cylinder 58, the sealing ball 62 is moved toward the axial direction distal end side of the cylinder 58, and is compressed and deformed in the axial direction of the cylinder 58.

Further, a moving member 64 is disposed at the inner side of the cylinder 58 of the pretensioner 26. The moving member 64 is formed from a synthetic resin material, and can deform by receiving external force. The moving member 64 is disposed further toward the axial direction distal end side of the cylinder 58 than the sealing ball 62. When the sealing ball 62 is moved toward the axial direction distal end side of the cylinder 58, the moving member 64 is moved toward the axial direction distal end side of the cylinder 58 while being pushed by the sealing ball 62 and being guided by the cylinder 58.

Moreover, the moving member 64 has a moving member main body 66 that serves as a moving main body and structures a pierced portion. The moving member main body 66 is formed in the shape of a rod that is solid cylindrical. The outer diameter dimension of the moving member main body 66 is made to be slightly smaller than the inner diameter dimension of the cylinder 58 (is made to be a dimension that does not fit together with the inner side of the cylinder 58), and is made to be the same as the gap dimension between the first facing plate 30A and the second facing plate 36A of the rotating member 28 (is made to be a dimension that can be fitted together between the first facing plate 30A and the second facing plate 36A).

A small diameter portion 68, which serves as a first portion and structures the pierced portion and the narrow portion, is formed at the axial direction distal end of the moving member main body 66. The small diameter portion 68 is formed in the shape of a solid cylinder. The outer diameter dimension of the small diameter portion 68 is made to be smaller than the outer diameter dimension of the moving member main body 66 (is made to be a dimension that does not fit together between the first facing plate 30A and the second facing plate 36A of the rotating member 28), and the small diameter portion 68 is disposed coaxially with the moving member main body 66. A conical portion 70 that serves as a second portion and structures the narrow portion is formed at the axial direction distal end of the moving member 64 at the small diameter portion 68 (the end at the side, which is opposite the moving member main body 66, of the small diameter portion 68). The conical portion 70 is formed in the shape of a cone or the shape of a truncated cone that is coaxial with the moving member main body 66. The outer diameter dimension of the conical portion 70 becomes smaller toward the axial direction distal end side of the moving member 64 at the conical portion 70 (the side of the conical portion 70 that is opposite the small diameter portion 68).

On the other hand, the cylinder 58 of the pretensioner 26 bends at an axial direction intermediate portion thereof. The axial direction distal end portion of the cylinder 58 is disposed at a vehicle front upper side at the vehicle front side of the frame 12, and is nipped and held by the cover plate 50 and the frame 12. A vicinity of the axial direction distal end portion of the cylinder 58 is offset toward the vehicle transverse direction outer side and the vehicle front side as the extending direction thereof heads toward the axial direction distal end side. The central axis of the axial direction distal end portion of the cylinder 58 is rectilinear, and the axial direction distal end of the cylinder 58 opens to the substantially vehicle lower side (in more detail, the side of a direction that is inclined toward the vehicle transverse direction outer side with respect to the vehicle lower side).

Figure 2:
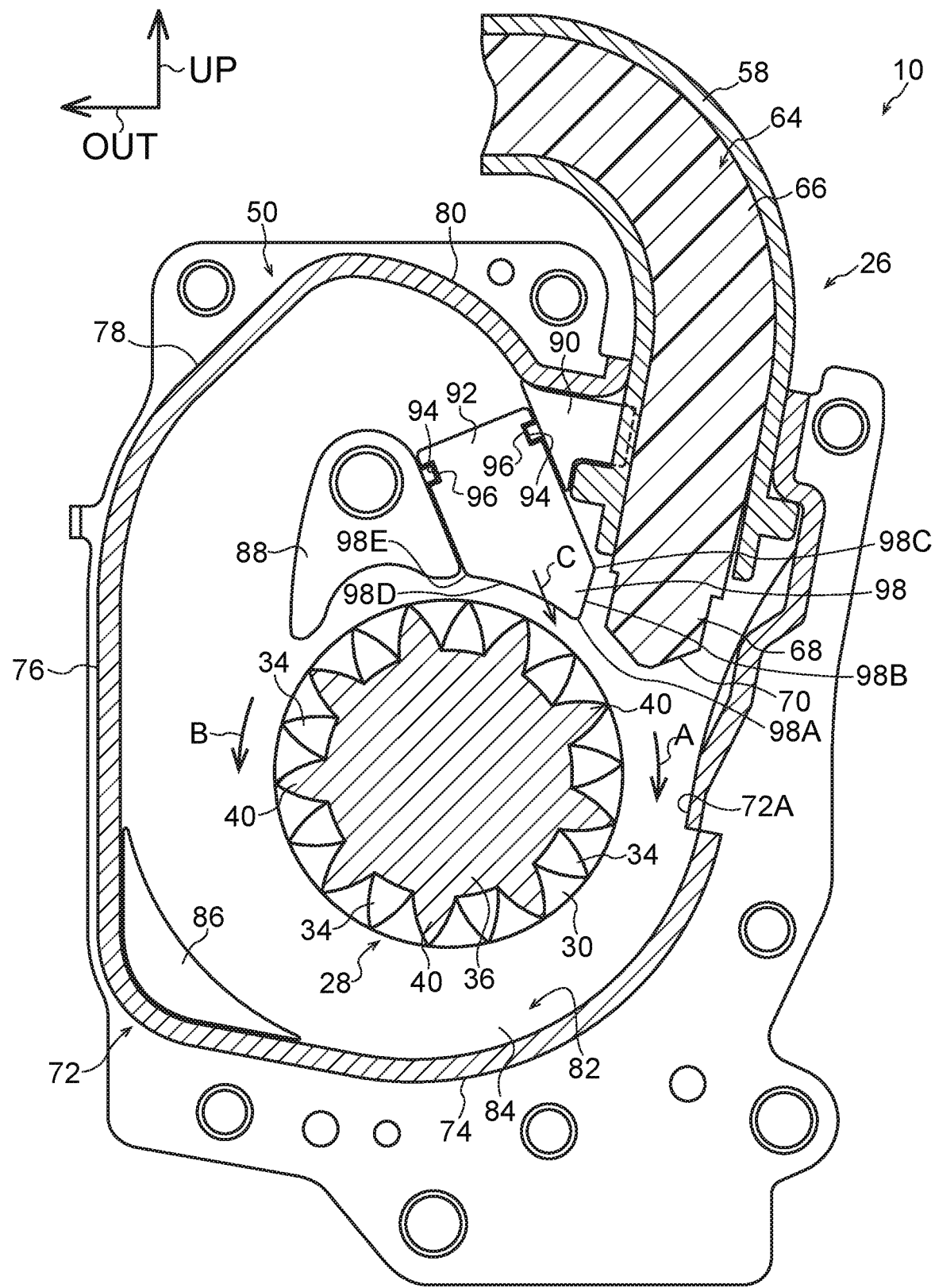
FIG. 2 is a side view in which the inner side of a cover plate is seen from a vehicle front side.

As shown in FIG. 2, the axial direction distal end portion of the moving member 64 projects-out toward the vehicle lower side from the axial direction distal end of the cylinder 58, and enters into the inner side of the cover plate 50. At the small diameter portion 68 and the conical portion 70, the axial direction distal end portion of the moving member 64 is disposed between the first facing plate 30A of the first rotating portion 30 and the second facing plate 36A of the second rotating portion 36 at the rotating member 28, and is apart from the first facing plate 30A and the second facing plate 36A (see FIG. 9). Further, even if the rotating member 28 is displaced in the axial direction between the leg plate 12A of the frame 12 and the bottom plate 52 of the cover plate 50, the separation of the small diameter portion 68 and the conical portion 70 from the first facing plate 30A and the second facing plate 36A is maintained (see FIG. 11).

Figure 3:
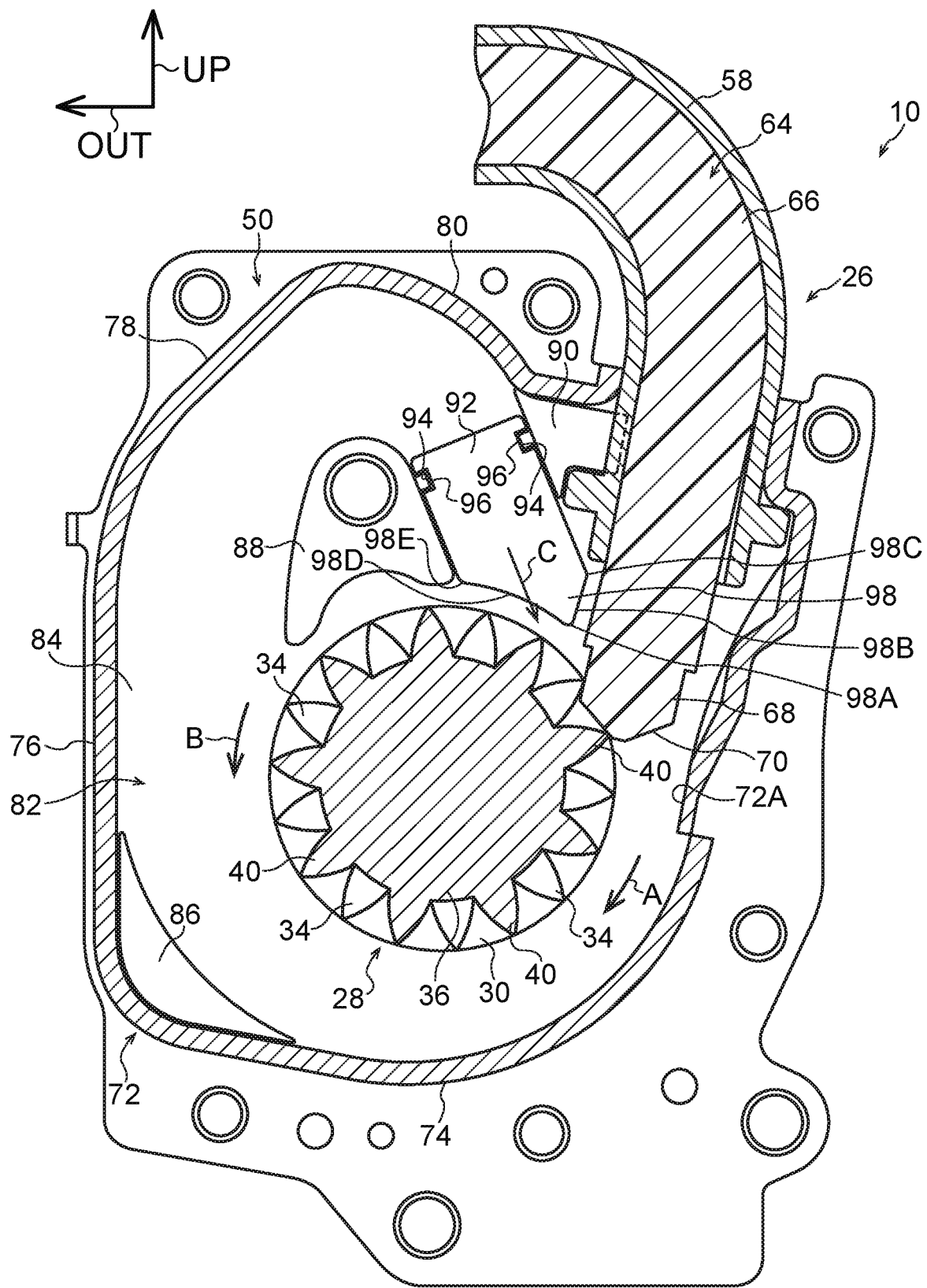
FIG. 3 is a side view that corresponds to FIG. 2 and shows a state in which a small diameter portion and a conical portion of a moving member collide with a first tooth and a second tooth of a rotating member.
Figure 10:
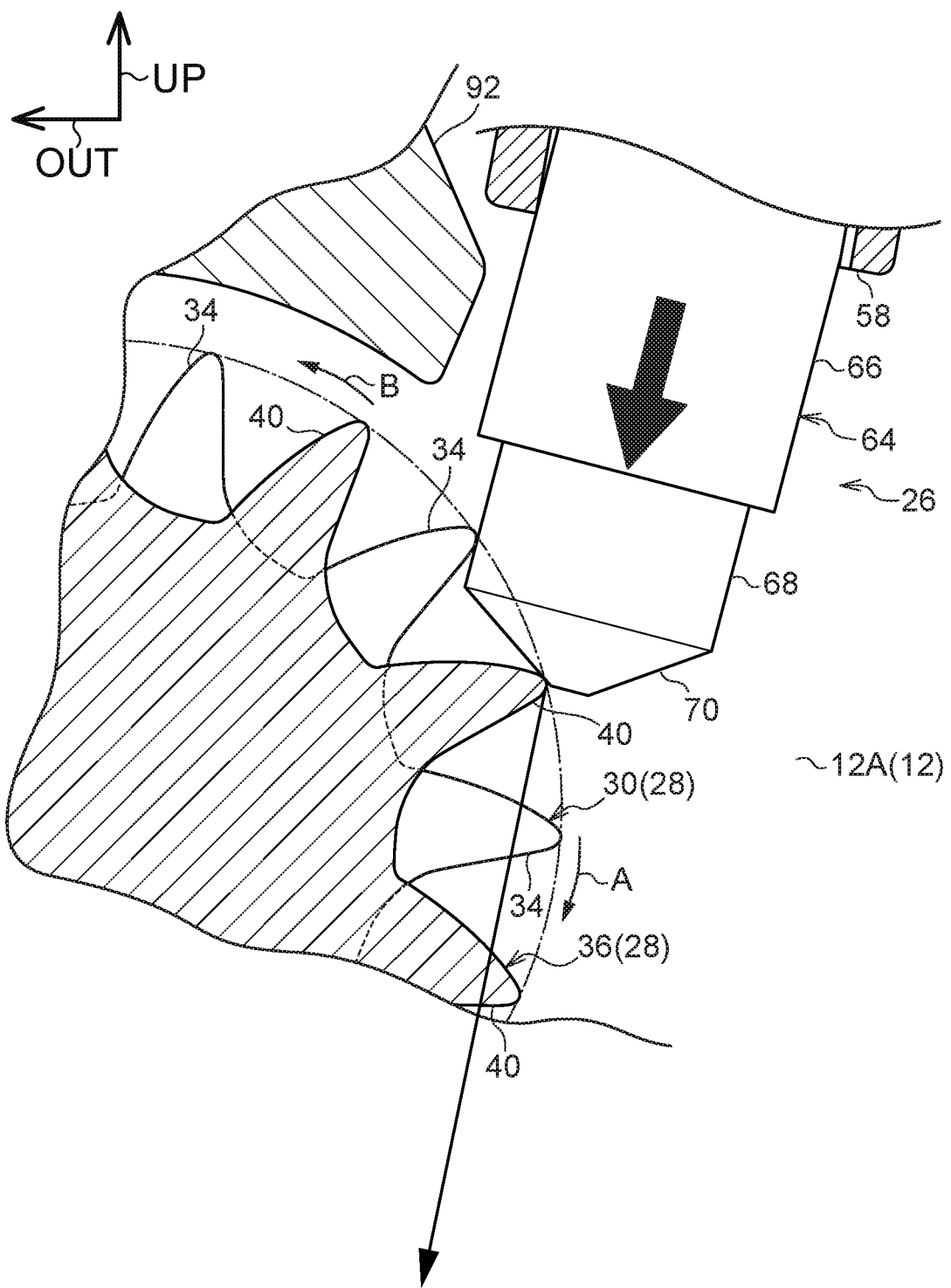
FIG. 10 is an enlarged side view of FIG. 3.
Figure 11:
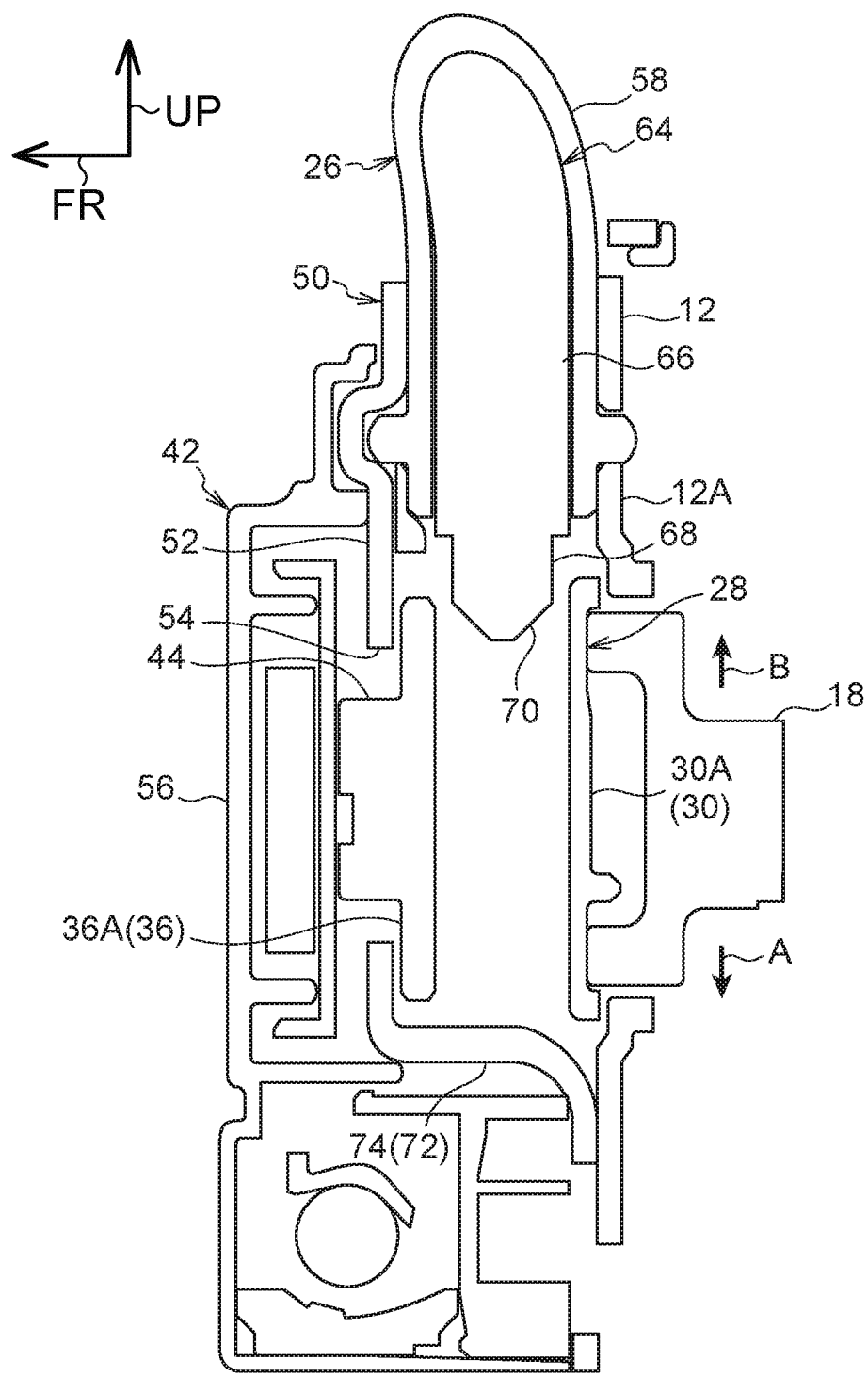
FIG. 11 is a cross-sectional view in which the inner side of the cover plate is seen from a vehicle transverse direction inner side.

When the moving member 64 is pushed by the sealing ball 62, and the small diameter portion 68 and the conical portion 70 of the moving member 64 are moved toward the vehicle lower side, as shown in FIG. 3 and FIG. 10, the conical portion 70 collides with one of the first tooth 34 of the first rotating portion 30 or the second tooth 40 of the second rotating portion 36, and the small diameter portion 68 collides with the other of the first tooth 34 or the second tooth 40. In this state, when the one of the first tooth 34 or the second tooth 40 is pushed toward the vehicle lower side by the conical portion 70 while crushing the conical portion 70 (while biting into the conical portion 70), the rotating member 28 is rotated in the take-up direction (the arrow A direction in FIG. 3 and the like), and the moving member 64 is moved further toward the vehicle lower side by the pressure from the sealing ball 62.

Figure 4:
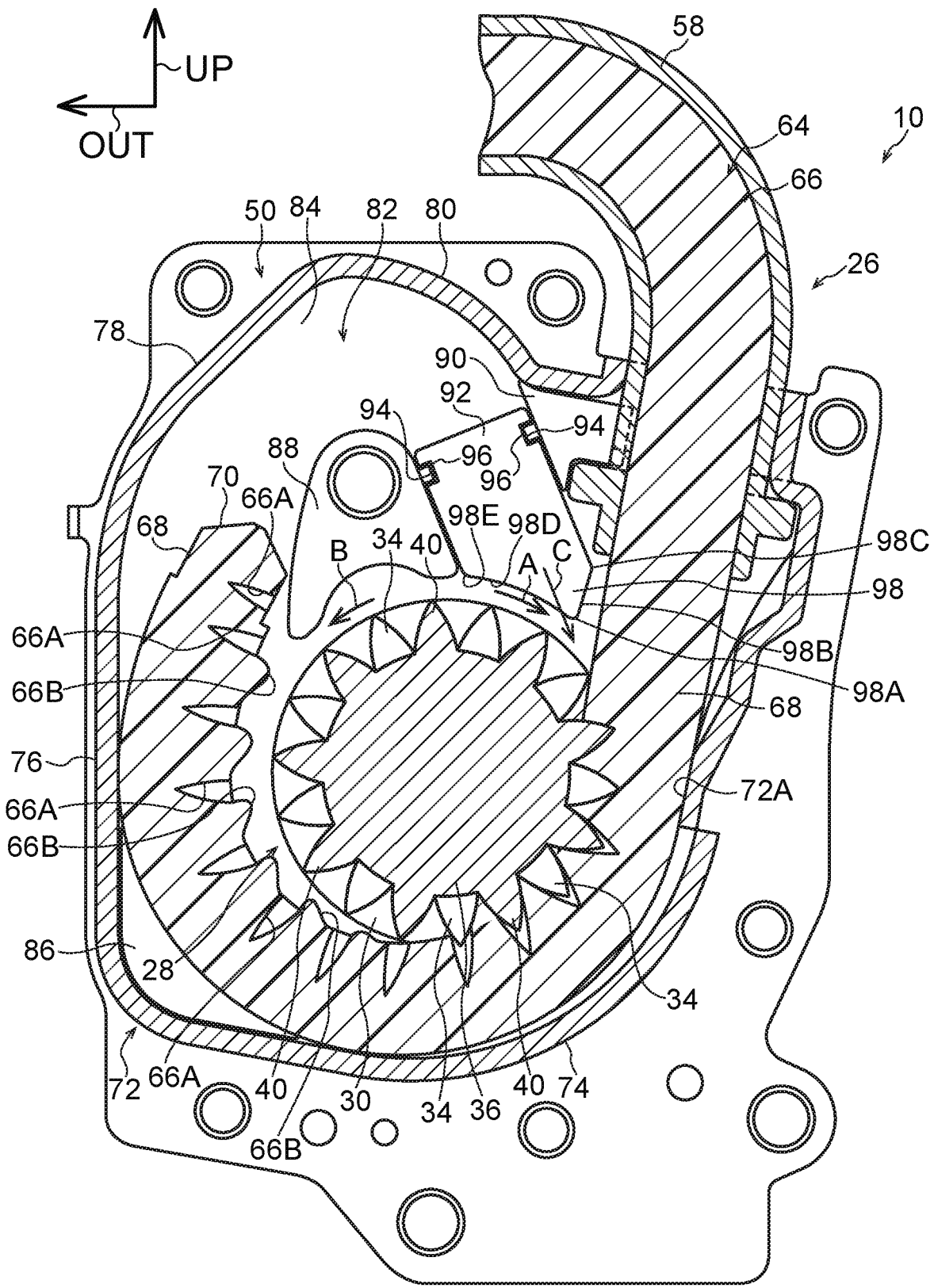
FIG. 4 is a side view that corresponds to FIG. 3 and shows a state in which the conical portion of the moving member has moved to between the rotating member and an outer side wall portion of a side wall.

In this way, due to the moving member 64 being moved toward the vehicle lower side and the rotating member 28 being rotated in the take-up direction, as shown in FIG. 4, the first teeth 34 of the first rotating portion 30 and the second teeth 40 of the second rotating portion 36 of the rotating member 28 pierce (bite into) the moving member 64 (the small diameter portion 68 and the moving member main body 66), and, in this state, due to the moving member 64 being moved further toward the vehicle lower side, the rotating member 28 is rotated further in the take-up direction.

On the other hand, as shown in FIG. 1 and FIG. 2, the cover plate 50 has a side wall 72 that structures a guide. The side wall 72 is provided along the outer peripheral portion of the bottom plate 52 of the cover plate 50, and, as shown in FIG. 2, the rotating member 28 is disposed at the inner side of the side wall 72. The side wall 72 has a close surface 72A, a lower wall portion 74, an outer side wall portion 76, an upper wall outer side portion 78, and an upper wall inner side portion 80. The close surface 72A is the inner peripheral surface portion of the side wall 72 at the vehicle transverse direction inner side of the first teeth 34 and the second teeth 40. Among the inner peripheral surfaces of the side wall 72, the close surface 72A is the closest to the locus of rotation of the first teeth 34 and the second teeth 40. The lower wall portion 74 is the vehicle lower side portion of the side wall 72, and the outer side wall portion 76 is the vehicle transverse direction outer side portion of the side wall 72. Further, the upper wall outer side portion 78 and the upper wall inner side portion 80 are the vehicle upper side portion of the side wall 72. The upper wall outer side portion 78 is inclined toward the vehicle upper side with respect to the vehicle transverse direction inner side. The upper wall inner side portion 80 is inclined toward the vehicle lower side with respect to the vehicle transverse direction inner side.

Further, as shown in FIG. 2, a guide member 82, which, together with the side wall 72, structures the guide, and which serves as a second expansion suppressor and structures the expansion suppressor, is provided at the inner side of the cover plate 50. The guide member 82 has a base portion 84. The base portion 84 faces the leg plate 12A at the vehicle front side of the leg plate 12A of the frame 12. Therefore, the interval between the base portion 84 and the bottom plate 52 of the cover plate 50 along the vehicle longitudinal direction is made to be smaller than the interval between the leg plate 12A and the bottom plate 52 of the cover plate 50. A first guiding portion 86, a second guiding portion 88 and a third guiding portion 90 are provided at the vehicle front side of the base portion 84.

The first guiding portion 86 is provided at the vehicle lower side end portion of the vehicle transverse direction outer side end portion at the inner side of the side wall 72. Further, the second guiding portion 88 is provided at the vehicle upper side of the rotating member 28 at the inner side of the side wall 72. Moreover, the third guiding portion 90 is provided at the vehicle lower side of the upper wall inner side portion 80 of the cover plate 50, at the vehicle transverse direction inner side of the second guiding portion 88. The vehicle transverse direction outer side surface of the third guiding portion 90 continues from the vehicle transverse direction outer side surface of the upper wall inner side portion 80 of the cover plate 50. Further, the interval between the second guiding portion 88 and the third guiding portion 90 is made to be larger than the outer diameter dimension of the moving member main body 66 of the moving member 64, and the moving member main body 66 can enter in between the second guiding portion 88 and the third guiding portion 90 (see FIG. 8).

As shown in FIG. 4 and the like, when the first teeth 34 of the first rotating portion 30 or the second teeth 40 of the second rotating portion 36 of the rotating member 28 pierce the moving member main body 66, grooves 66A that correspond to the shapes of the first teeth 34 or the second teeth 40 are formed in the moving member main body 66, and, at portions that are further toward the axial direction proximal end side of the moving member main body 66 than these grooves 66A, bulging portions 66B, at which the moving member main body 66 deforms so as to bulge-out toward the opening direction sides of the grooves 66A, are formed at the moving member main body 66.

Further, as shown in FIG. 2, the stopper 92, which serves as the first expansion suppressor and structures the expansion suppressor, is provided between the second guiding portion 88 and the third guiding portion 90 of the guide member 82. The stopper 92 is formed in the shape of a rod from a synthetic resin material that is harder than the moving member 64. The length direction of the stopper 92 (the arrow C direction in FIG. 2 and the like) is tilted toward the vehicle lower side with respect to the vehicle transverse direction inner side. The stopper 92 can move in the length direction of the stopper 92 by being guided by the second guiding portion 88 and the third guiding portion 90 of the guide member 82.

Figure 7:
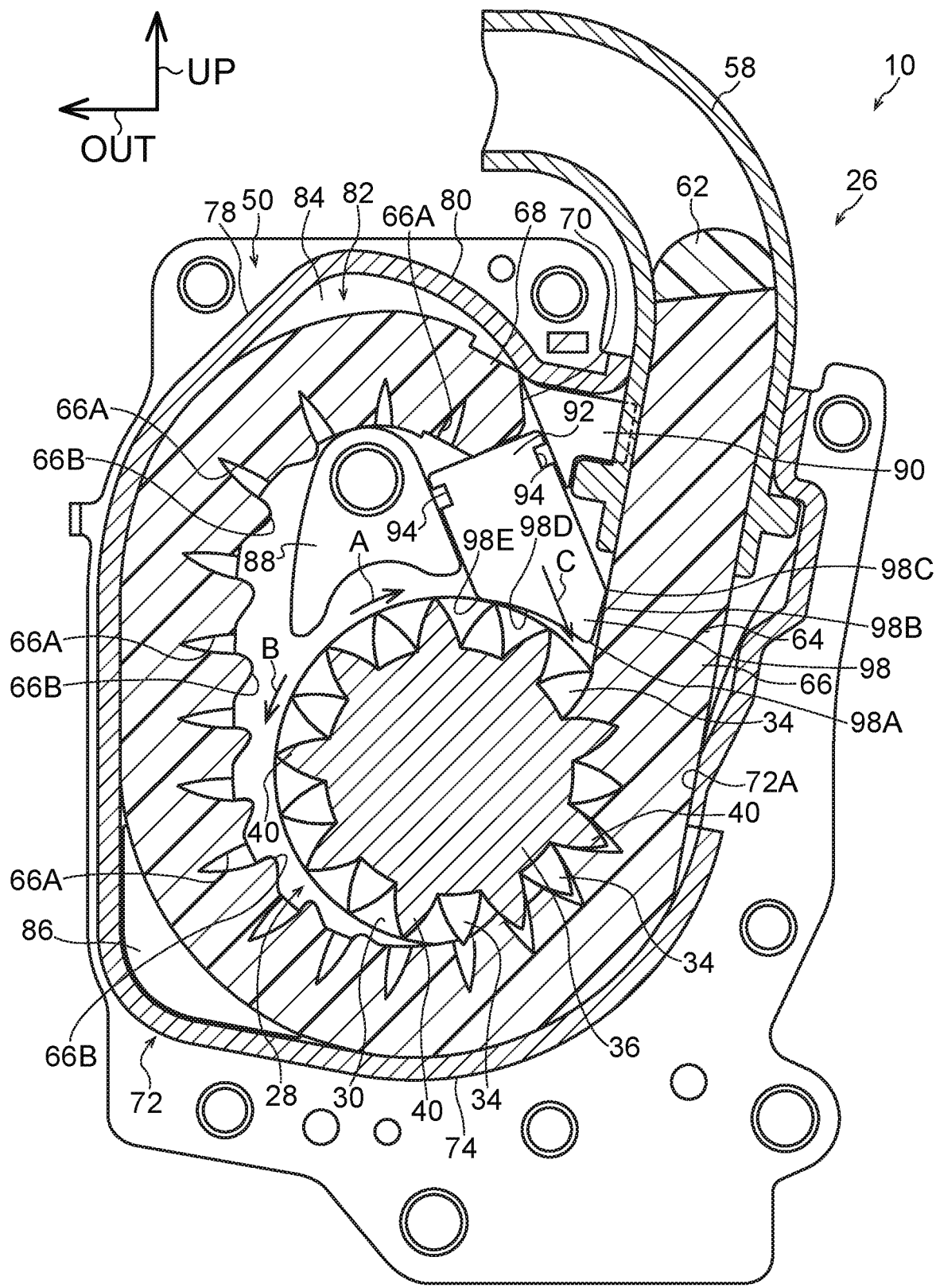
FIG. 7 is a side view that corresponds to FIG. 6 and shows a state in which the stopper, which is pushed by the conical portion of the moving member, is moved and abuts a moving member main body of the moving member.
Figure 8:
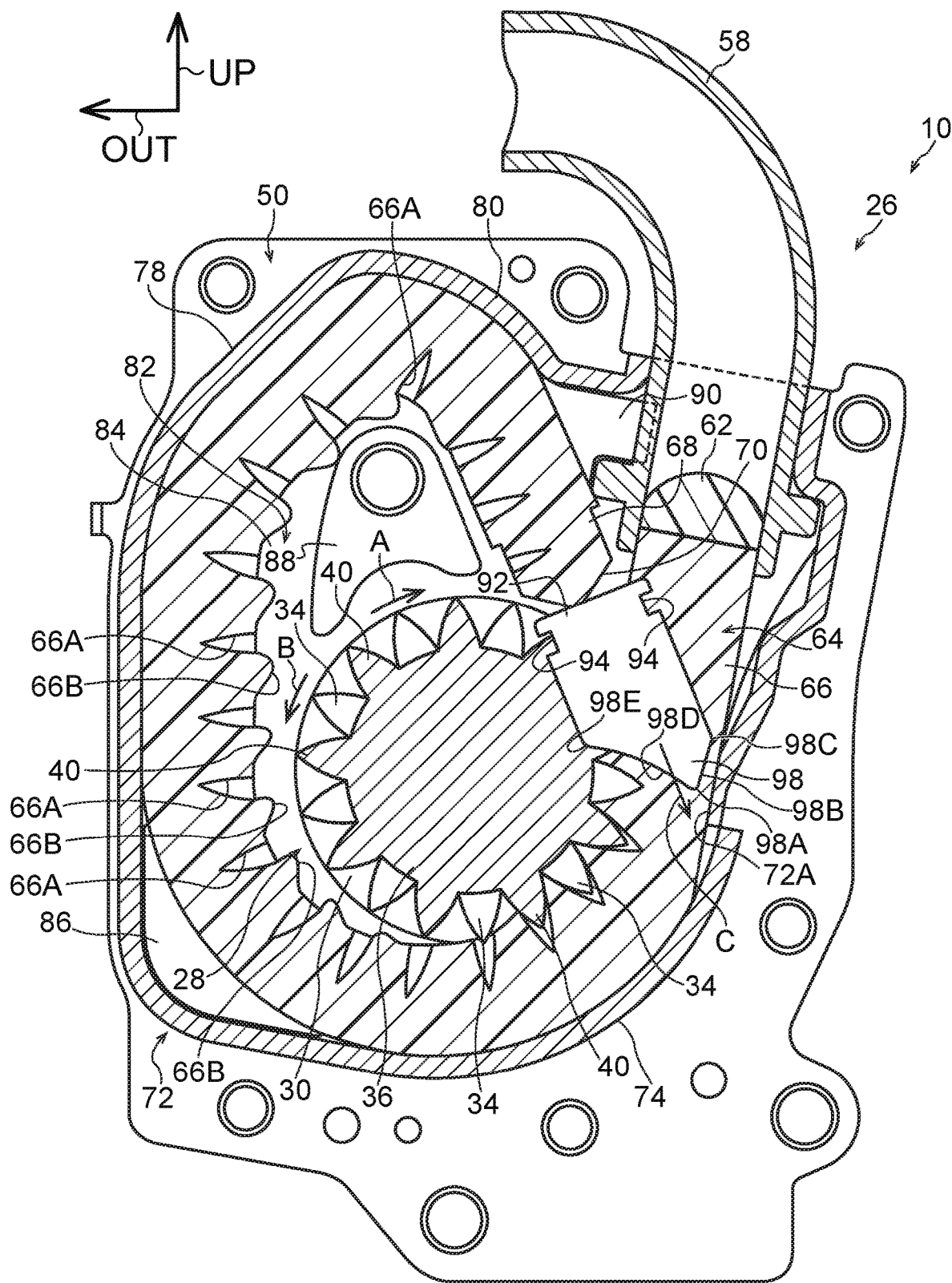
FIG. 8 is a side view that corresponds to FIG. 7 and shows a state in which the stopper is moved to a portion of engagement of the moving member main body and the rotating member.

Moreover, a pair of concave portions 94 are formed in the length direction proximal end portion of the stopper 92 (the end portion, which is at the side in the direction opposite arrow C in FIG. 2 and the like, at the stopper 92). The concave portions 94 open at the outer peripheral surface of the stopper 92. A pair of ribs 96 are disposed in the pair of concave portions 94 respectively. One of the ribs 96 projects-out from the second guiding portion 88 of the guide member 82 in a direction that is inclined toward the vehicle upper side with respect to the vehicle transverse direction inner side. The other of the ribs 96 projects-out from the third guiding portion 90 of the guide member 82 in a direction that is inclined toward the vehicle lower side with respect to the vehicle transverse direction outer side. Due to these ribs 96 being disposed in the pair of concave portions 94, the stopper 92 is held by the second guiding portion 88 and the third guiding portion 90 of the guide member 82. As shown in FIG. 7 and FIG. 8, the stopper 92 can move toward a length direction side thereof due to the ribs 96 being sheared.

Moreover, as shown in FIG. 2, a tapered portion 98 is formed at the length direction distal end portion of the stopper 92 (the end portion at the arrow C direction side in FIG. 2 and the like of the stopper 92). The tapered portion 98 is made to be a tapered shape as seen from the vehicle front side. The portion, which is further toward the vehicle transverse direction inner side of the tapered portion 98 than a distal end 98A in the length direction of the stopper 92, at the tapered portion 98 is made to be an inner side portion 98B. The length direction proximal end of the stopper 92 at the inner side portion 98B is made to be an inner side proximal end 98C. The inner side portion 98B is inclined toward the vehicle transverse direction outer side with respect to the axial direction of the moving member 64 that is between the axial direction distal end of the cylinder 58 and the vehicle lower side portion of the side wall 72 of the cover plate 50. When the stopper 92 is moved toward the length direction distal end side (the arrow C direction side in FIG. 2 and the like), the inner side proximal end 98C of the tapered portion 98 abuts the moving member 64 earlier than the distal end 98A of the tapered portion 98 abuts the moving member 64.

On the other hand, the portion, which is further toward the vehicle transverse direction outer side of the tapered portion 98 than the distal end 98A, of the tapered portion 98 is made to be an outer side portion 98D. The length direction proximal end of the stopper 92 at the outer side portion 98D is made to be an outer side proximal end 98E. The outer side portion 98D is inclined toward the vehicle transverse direction inner side with respect to the length direction distal end side of the stopper 92. Therefore, in the state in which the inner side proximal end 98C of the tapered portion 98 abuts the moving member 64, the outer side proximal end 98E of the tapered portion 98 does not enter onto the locus of rotation of the first teeth 34 and the second teeth 40 of the rotating member 28. Moreover, the formed positions of the inner side proximal end 98C and the outer side proximal end 98E of the tapered portion 98 are set such that the inner side proximal end 98C of the tapered portion 98 abuts the moving member 64 when the outer side proximal end 98E of the tapered portion 98 enters onto the locus of rotation of the first teeth 34 and the second teeth 40 of the rotating member 28 due to the stopper 92 being moved toward the length direction distal end side.

By the way, as shown from FIG. 5 through FIG. 8, the sealing ball 62 and the moving member 64 are compressively deformed in the axial direction of the cylinder 58 by the pressure of the gas that is supplied from the MGG 60. Here, as shown in FIG. 8, the axial direction length of the moving member 64, including the conical portion 70 and the small diameter portion 68, and the pressure of the gas that is supplied from the MGG 60 are set such that, in the state in which the tapered portion 98 of the stopper 92 has engaged with as far as the central axis side of the moving member 64 at the axial direction proximal end side portion of the moving member main body 66 of the moving member 64, the axial direction proximal end of the moving member 64 is disposed at the inner side of the cylinder 58.

Operation, Effects of Present Embodiment

Operation and effects of the present embodiment are described next.

In the present webbing retractor 10, at the time of a vehicle collision which is one form of a time of a vehicle emergency, when the MGG 60 of the pretensioner 26 is operated by the ECU, high-pressure gas is instantaneously supplied from the MGG 60 to the inner side of the cylinder 58. When the sealing ball 62 is moved toward the axial direction distal end side of the cylinder 58 by the pressure of this gas, the moving member 64 is pushed by the sealing ball 62 and is moved toward the axial direction distal end side.

Due to the moving member 64 being moved toward the axial direction distal end side, the conical portion 70 of the moving member 64 collides with one of the first tooth 34 or the second tooth 40 of the rotating member 28, and the small diameter portion 68 of the moving member 64 collides with the other of the first tooth 34 or the second tooth 40 (see FIG. 3 and FIG. 10). Due thereto, when the one of the first tooth 34 or the second tooth 40 of the rotating member 28 is pushed toward the vehicle lower side by the conical portion 70 of the moving member 64, the rotating member 28 is rotated in the take-up direction (the arrow A direction in FIG. 4 and the like).

Moreover, as shown in FIG. 4, the first teeth 34 and the second teeth 40, which are further toward the pull-out direction side (the arrow B direction side in FIG. 2 and the like) than the one of the first tooth 34 or the second tooth 40 that is pushed by the conical portion 70 of the moving member 64, pierce toward the radial direction central side from the outer peripheral surface of the moving member 64 into the small diameter portion 68 and the moving member main body 66 of the moving member 64 due to the rotation of the rotating member 28 in the take-up direction. Further, at the time when the moving member 64 passes the close surface 72A of the side wall 72 of the cover plate 50, the close surface 72A limits the movement of the moving member 64 toward the vehicle transverse direction inner side (the radial direction outer side of the rotating member 28), and the amount of piercing of the first teeth 34 and the second teeth 40 into the moving member 64 is at the maximum.

In this way, due to the moving member 64, which the first teeth 34 and the second teeth 40 have pierced, being moved toward the vehicle lower side, the rotating member 28 is rotated further in the take-up direction (the arrow A direction in FIG. 4 and the like). The rotation of the rotating member 28 in the take-up direction is transmitted via the torsion bar 24 to the spool 18, and the spool 18 is rotated in the take-up direction. Due thereto, the webbing 20 is taken up onto the spool 18, and the force of restraining the passenger by the webbing 20 is increased.

Figure 5:
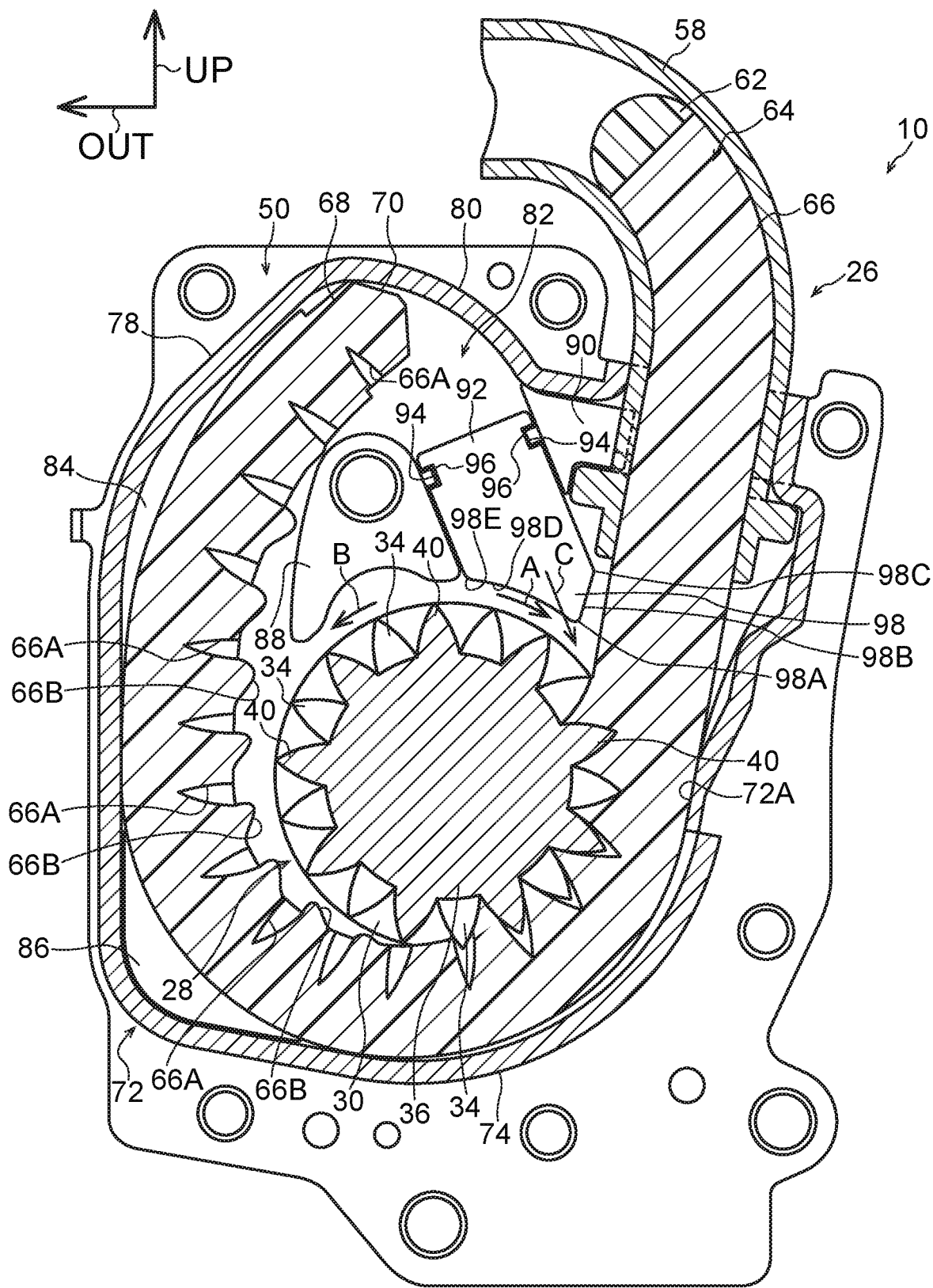
FIG. 5 is a side view that corresponds to FIG. 4 and shows a state in which an axial direction proximal end of the moving member at the conical portion abuts an upper wall inner side portion of the side wall.

On the other hand, when the conical portion 70 of the moving member 64 is moved further toward the vehicle lower side than the rotating member 28 due to the moving member 64 being pushed by the sealing ball 62, the conical portion 70 of the moving member 64 is guided by the lower wall portion 74 of the side wall 72 of the cover plate 50, the first guiding portion 86 of the guide member 82, and the outer side wall portion 76 of the side wall 72, and is moved toward the vehicle upper side (see FIG. 4 and FIG. 5). Due thereto, as shown in FIG. 5, the axial direction proximal end of the moving member 64 at the conical portion 70 (the small diameter portion 68 side end of the moving member 64 at the conical portion 70) abuts the upper wall inner side portion 80 of the side wall 72.

Figure 6:
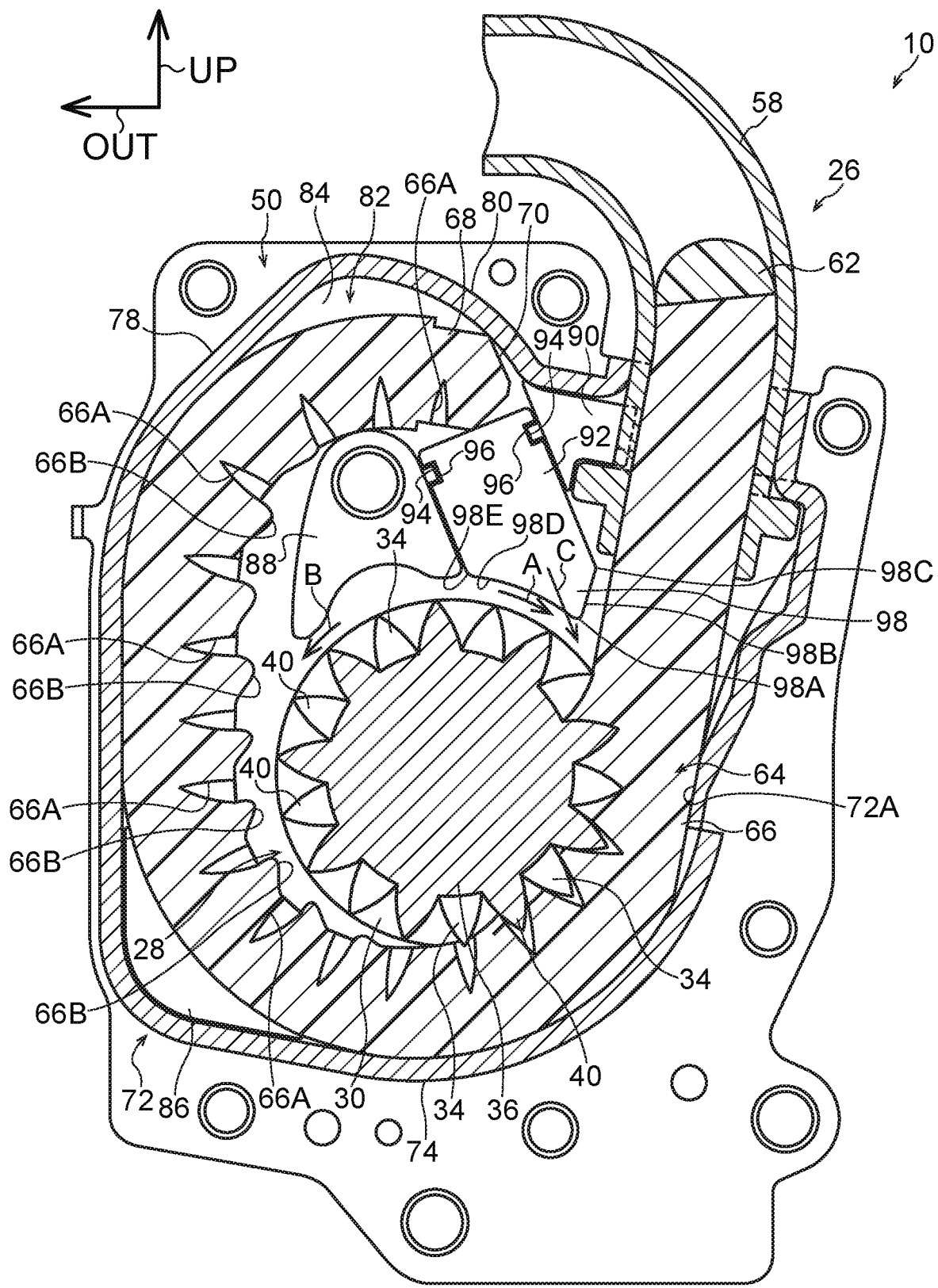
FIG. 6 is a side view that corresponds to FIG. 5 and shows a state in which the axial direction proximal end of the moving member at the conical portion abuts a length direction proximal end of a stopper.

In this state, when the moving member 64 is pushed further by the sealing ball 62, the axial direction proximal end of the moving member 64 at the conical portion 70 is guided by the upper wall inner side portion 80 and is moved in a direction that is inclined toward the vehicle lower side with respect to the vehicle transverse direction inner side. Due thereto, as shown in FIG. 6, the side, which is opposite the portion of the axial direction proximal end of the moving member 64 that abuts the upper wall inner side portion 80, at the conical portion 70 abuts the length direction proximal end of the stopper 92, and the axial direction distal end portion of the moving member main body 66 of the moving member 64 abuts the second guiding portion 88 of the guide member 82.

Next, from this state, when the moving member 64 is pushed further by the sealing ball 62, and the pushing force, which is imparted from the conical portion 70 of the moving member 64 to the length direction proximal end of the stopper 92, becomes greater than the shearing strength of the ribs 96 of the second guiding portion 88 and the third guiding portion 90 of the guide member 82, the ribs 96 are sheared. Due thereto, as shown in FIG. 7, the stopper 92 is, by the pushing force from the conical portion 70, guided by the second guiding portion 88 and the third guiding portion 90 and is moved.

When the stopper 92 is moved in this way, the inner side proximal end 98C of the tapered portion 98 of the stopper 92 abuts the moving member main body 66 of the moving member 64 at further toward the vehicle upper side than the first tooth 34 or the second tooth 40, which contacts the moving member main body 66 of the moving member 64 the furthest toward the pull-out direction side (the arrow B direction side in FIG. 7), among the first teeth 34 and the second teeth 40 of the rotating member 28.

Moreover, in this state, the rotating member 28 is rotated in the take-up direction (the arrow A direction in FIG. 7 and the like), and the portion, which sticks-out from the axial direction distal end of the cylinder 58, of the moving member 64 is moved toward the vehicle lower side. Therefore, the stopper 92 that is pushing the moving member 64 is moved toward the side of the portion of engagement of the moving member 64 and the first teeth 34 and the second teeth 40 of the rotating member 28, due to at least one of rotation of the rotating member 28 in the take-up direction or movement of the moving member 64 toward the vehicle lower side (see FIG. 8).

In this way, due to the stopper 92 being moved toward the side of the portion of engagement of the moving member 64 and the first teeth 34 and the second teeth 40 of the rotating member 28, the tapered portion 98 of the stopper 92 engages with the moving member main body 66 so as to pierce or bite into the moving member main body 66, and, moreover, rotation of the rotating member 28 in the take-up direction and movement of the moving member 64 toward the vehicle lower side (movement of the moving member 64 toward the axial direction distal end side) are suppressed. Due thereto, movement of the portion, which is further toward the axial direction proximal end side than the portion engaged by the tapered portion 98 of the stopper 92, of the moving member main body 66 toward the axial direction distal end side of the moving member 64 is suppressed.

Here, the sectional surface area, in the direction orthogonal to the axis, of the small diameter portion 68 of the moving member 64 is made to be small as compared with the moving member main body 66 of the moving member 64. The outer diameter dimension of the small diameter portion 68 is made to be a dimension that is such that the separation of the small diameter portion 68 from the first facing plate 30A and the second facing plate 36A of the rotating member 28 is maintained even if the rotating member 28 is displaced in the axial direction between the leg plate 12A of the frame 12 and the bottom plate 52 of the cover plate 50. Therefore, as described above, at the time when the moving member 64 is moved toward the axial direction distal end side, the sliding resistance of the moving member 64 with the rotating member 28, the cover plate 50 and the guide member 82 can be made to be small by the conical portion 70, and the resistance to movement of the moving member 64 can be reduced. Due thereto, the moving member 64 can move efficiently toward the axial direction distal end side, and the moving member 64 can efficiently rotate the rotating member 28 in the take-up direction, and the performance of the pretensioner 26 rotating the spool 18 in the take-up direction can be improved. Accordingly, the force of driving the moving member 64 by the MGG 60 can be reduced, the pressure resist strengths of the respective structural parts of the pretensioner 26 (e.g., the plate thickness dimension of the cylinder 58 peripheral wall and the outer diameter dimension of the moving member 64) can be reduced, and the cost can be decreased.

Moreover, at the time when the first tooth 34 or the second tooth 40 pierces the small diameter portion 68, and the small diameter portion 68 rotates the rotating member 28 in the take-up direction, because slack exists in the portion of the webbing 20 that is taken up on the spool 18, resistance to rotation of the spool 18 and the rotating member 28 in the take-up direction is small. Therefore, even in a case in which, as described above, by making the sectional surface area, in the direction orthogonal to the axis, of the small diameter portion 68 be small, the maximum piercing amount of the first tooth 34 or the second tooth 40 into the small diameter portion 68 is made to be small, and the force of rotating the rotating member 28 in the take-up direction by the small diameter portion 68 is small, the small diameter portion 68 can rotate the rotating member 28 in the take-up direction.

Further, the outer diameter dimension of the moving member main body 66 is made to be slightly smaller than the inner diameter dimension of the cylinder 58, and is made to be the same as the gap dimension between the first facing plate 30A and the second facing plate 36A of the rotating member 28. Therefore, at the time when the moving member 64 is moved toward the axial direction distal end side, the sliding resistance of the moving member 64 with the cylinder 58, the rotating member 28, the cover plate 50 and the guide member 82 can be made to be small by the moving member main body 66, and the resistance to movement of the moving member 64 can be reduced. Due thereto, the moving member 64 can move efficiently toward the axial direction distal end side, and the moving member 64 can efficiently rotate the rotating member 28 in the take-up direction, and the performance of the pretensioner 26 rotating the spool 18 in the take-up direction can be improved.

Moreover, at the time when the first teeth 34 and the second teeth 40 pierce the moving member main body 66, and the moving member main body 66 rotates the rotating member 28 in the take-up direction, the slack in the portion of the webbing 20 that is wound on the spool 18 is eliminated, and therefore, the resistance to rotation of the spool 18 and the rotating member 28 in the take-up direction becomes large. Therefore, by making the sectional surface area, in the direction orthogonal to the axis, of the moving member main body 66 be large as compared with the small diameter portion 68, and making the maximum piercing amounts of the first teeth 34 and the second teeth 40 into the moving member main body 66 be large, the force of rotating the rotating member 28 in the take-up direction by the moving member main body 66 can be made to be large, and the moving member main body 66 can rotate the rotating member 28 in the take-up direction.

Further, the sectional surface areas, in the direction orthogonal to the axis, of the conical portion 70 and the small diameter portion 68 of the moving member 64 are made to be small as compared with the moving member main body 66 of the moving member 64. Therefore, as described above, at the time when movement of the moving member 64 toward the axial direction distal end side is started, even if the conical portion 70 and the small diameter portion 68 collide with the first tooth 34 and the second tooth 40 of the rotating member 28, the collision load (impact load) from the conical portion 70 and the small diameter portion 68 to the first tooth 34 and the second tooth 40 can be reduced. Due thereto, the dimensions of all of the first teeth 34 and the second teeth 40 of the rotating member 28 (in particular, the dimensions in the rotating member 28 peripheral direction) can be made to be small, and the resistance at the time when the first teeth 34 and the second teeth 40 pierce the moving member 64 can be reduced, and the moving member 64 can efficiently rotate the rotating member 28 in the take-up direction, and the performance of the pretensioner 26 rotating the spool 18 in the take-up direction can be improved. Accordingly, the force of driving the moving member 64 by the MGG 60 can be reduced, and the pressure resist strengths of the respective parts of the pretensioner 26 can be reduced, and the cost can be decreased.

Moreover, at the time when movement of the moving member 64 toward the axial direction distal end side is started, the conical portion 70 and the small diameter portion 68 abut the two first tooth 34 and second tooth 40. Therefore, not only can the collision load from the conical portion 70 to one of the first tooth 34 or the second tooth 40 be reduced, but also, the collision load from the small diameter portion 68 to the other of the first tooth 34 or the second tooth 40 can be reduced. Due thereto, the dimensions of all of the first teeth 34 and the second teeth 40 of the rotating member 28 can effectively be made to be small, and the resistance at the time when the first teeth 34 and the second teeth 40 pierce the moving member 64 can be effectively reduced, and the moving member 64 can rotate the rotating member 28 more efficiently in the take-up direction, and the performance of the pretensioner 26 rotating the spool 18 in the take-up direction can be improved more.

Moreover, because the conical portion 70 is disposed further toward the radial direction inner side than the outer peripheral surface of the moving member main body 66, at the time when movement of the moving member 64 toward the axial direction distal end side is started, one of the first tooth 34 or the second tooth 40 collides with the conical portion 70 at a position that is further toward the moving member 64 side (the vehicle transverse direction inner side). Therefore, the pushing direction of the one of the first tooth 34 or the second tooth 40 by the conical portion 70 can be made to approach the rotation tangential direction of the one of the first tooth 34 or the second tooth 40, and the torque that is applied from the conical portion 70 to the one of the first tooth 34 or the second tooth 40 can be made to be large. Due thereto, the force of rotating the rotating member 28 in the take-up direction by the conical portion 70 can be made to be large, and the performance of the pretensioner 26 rotating the spool 18 in the take-up direction can be improved more.

Figure 9:
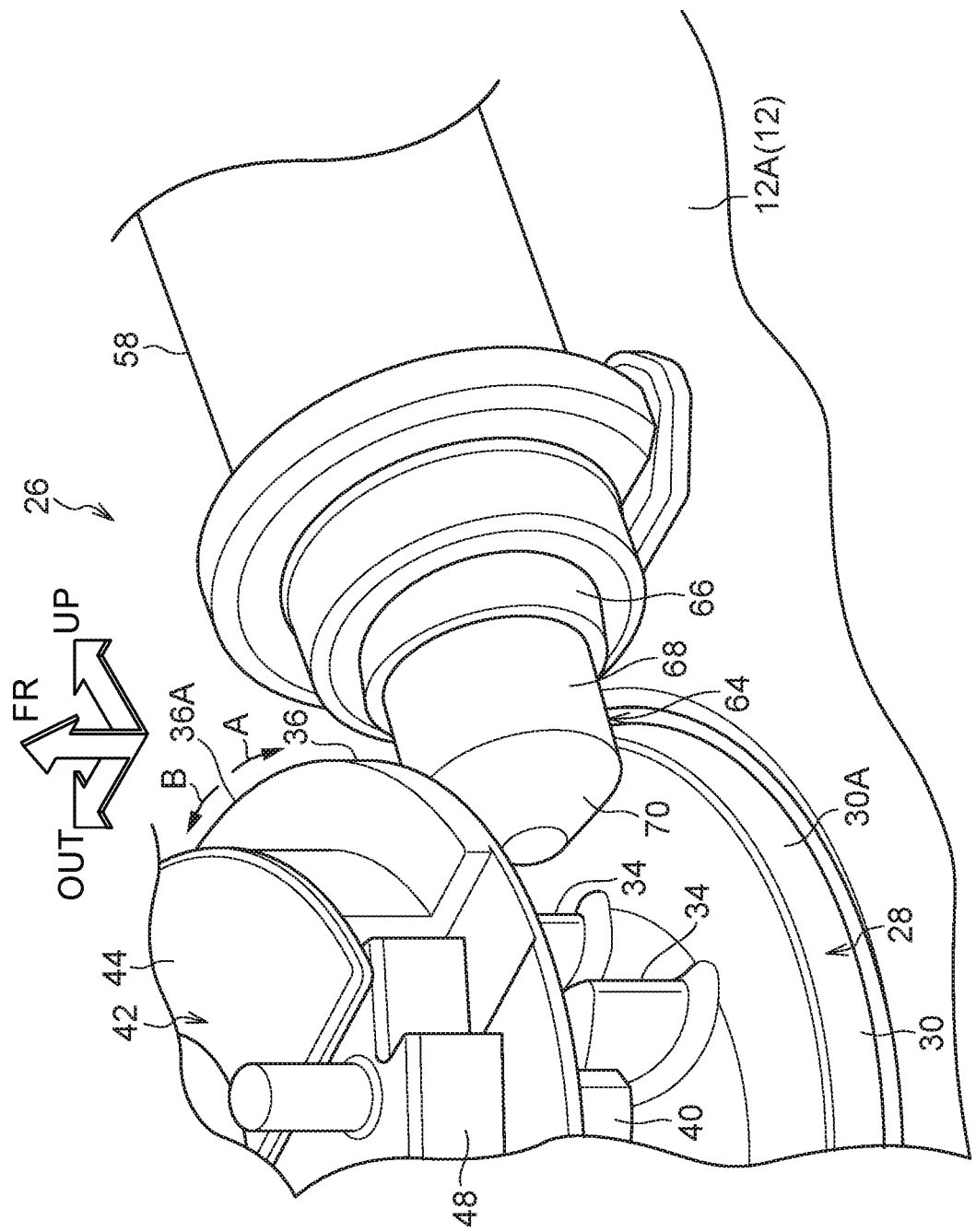
FIG. 9 is a perspective view of FIG. 2.

Further, as shown in FIG. 9, before the pretensioner 26 is operated, the axial direction distal end portion of the moving member 64 is, at the small diameter portion 68 and the conical portion 70, disposed between the first facing plate 30A and the second facing plate 36A of the rotating member 28, and is apart from the first facing plate 30A and the second facing plate 36A. Therefore, even in a case in which the axial direction distal end portion of the moving member 64 is disposed close to the first teeth 34 and the second teeth 40 of the rotating member 28, at the time when the rotating member 28 is rotated integrally with the spool 18, friction arising between the axial direction distal end portion of the moving member 64 and the first facing plate 30A and the second facing plate 36A can be suppressed, and resistance force from the axial direction distal end portion of the moving member 64 being applied to rotation of the spool 18 can be suppressed.

Moreover, the cross-sections, in the direction orthogonal to the axis, of the small diameter portion 68 and the conical portion 70 are made to be circular (are made to be shapes that have point symmetry around the central axis and shapes that have line symmetry with respect to the radial direction). Therefore, at the time of assembling the pretensioner 26, the need to adjust the position of the moving member 64 around the central axis with respect to the rotating member 28 due to the position of the moving member 64 around the central axis with respect to the cylinder 58 being adjusted while the moving member 64 is inserted into the cylinder 58, can be eliminated, and the pretensioner 26 can be assembled easily.

Note that, in the present embodiment, the moving member may body 66 is made to be solid cylindrical. However, the outer diameter dimension of the moving member main body 66 may be made to become gradually larger while heading toward the axial direction proximal end side of the moving member 64.

Second Embodiment

A webbing retractor 100 relating to a second embodiment of the present invention is described next on the basis of FIG. 12A.

The webbing retractor 100 relating to the present embodiment has a structure substantially similar to the above-described first embodiment, but differs with respect to the following points.

As shown in FIG. 12A, at the moving member 64 of the webbing retractor 100 relating to the present embodiment, an axial direction intermediate portion of the moving member main body 66 is made to be a main body portion 64A that is coaxial, and the portion, which is further toward the axial direction distal end side than the main body portion 64A, of the moving member main body 66 is made to be a medium diameter portion 64B that is coaxial, and the portion, which is further toward the axial direction proximal end side than the main body portion 64A, of the moving member main body 66 is made to be a large diameter portion 64C that is coaxial.

The main body portion 64A is solid cylindrical, and the outer diameter dimension of the main body portion 64A is made to be the same as the outer diameter dimension of the moving member main body 66 in the above-described first embodiment.

The medium diameter portion 64B is shaped as a truncated cone, and the outer diameter dimension thereof gradually becomes larger while heading toward the axial direction proximal end side. The maximum outer diameter dimension at the axial direction proximal end of the medium diameter portion 64B is made to be equal to the outer diameter dimension of the main body portion 64A (the gap dimension between the first facing plate 30A and the second facing plate 36A of the rotating member 28), and the minimum outer diameter dimension at the axial direction distal end of the medium diameter portion 64B is made to be large as compared with the outer diameter dimension of the small diameter portion 68 of the moving member 64 (is made to be a dimension that cannot fit together between the first facing plate 30A and the second facing plate 36A).

The large diameter portion 64C is solid cylindrical, and the outer diameter dimension of the large diameter portion 64C is made to be large as compared with the outer diameter dimension of the main body portion 64A, and is made to be the same as the inner diameter dimension of the cylinder 58 (is made to be a dimension that fits-together with the inner side of the cylinder 58). Further, the outer diameter dimension of the border portion between the large diameter portion 64C and the main body portion 64A becomes gradually larger while heading toward the axial direction proximal end side of the moving member 64.

Here, also at the webbing retractor 100 relating to the present embodiment, operation and effects that are similar to those of the above-described first embodiment can be obtained.

Moreover, at the moving member main body 66 of the moving member 64, although the sectional surface area, in the direction orthogonal to the axis, of the medium diameter portion 64B is large as compared with the sectional surface area, in the direction orthogonal to the axis, of the small diameter portion 68, it is less than or equal to the sectional surface area, in the direction orthogonal to the axis, of the main body portion 64A. Although the outer diameter dimension of the medium diameter portion 64B is large as compared with the outer diameter dimension of the small diameter portion 68, it is made to be less than or equal to the gap dimension between the first facing plate 30A and the second facing plate 36A of the rotating member 28. Therefore, at the time when the moving member 64 is moved toward the axial direction distal end side, the sliding resistance of the moving member 64 with the cylinder 58, the rotating member 28, the cover plate 50 and the guide member 82 can be made to be small by the medium diameter portion 64B, and the resistance to movement of the moving member 64 can be reduced. Due thereto, the moving member 64 can efficiently move toward the axial direction distal end side, and the moving member 64 can efficiently rotate the rotating member 28 in the take-up direction, and the performance of the pretensioner 26 rotating the spool 18 in the take-up direction can be improved.

Moreover, at the time when the first teeth 34 and the second teeth 40 pierce the medium diameter portion 64B, and the medium diameter portion 64B rotates the rotating member 28 in the take-up direction, because slack remains in the portion of the webbing 20 that is taken up on the spool 18, resistance to rotation of the spool 18 and the rotating member 28 in the take-up direction is relatively small. Therefore, even in a case in which, as described above, by making the sectional surface area, in the direction orthogonal to the axis, of the medium diameter portion 64B be relatively small, the maximum piercing amounts of the first teeth 34 and the second teeth 40 into the medium diameter portion 64B are made to be relatively small, and the force by which the medium diameter portion 64B rotates the rotating member 28 in the take-up direction is relatively small, the medium diameter portion 64B can rotate the rotating member 28 in the take-up direction.

Further, the outer diameter dimension of the large diameter portion 64C of the moving member main body 66 is made to be large as compared with the gap dimension between the first facing plate 30A and the second facing plate 36A of the rotating member 28, and is made to be the same as the inner diameter dimension of the cylinder 58.

Therefore, the sealability between the cylinder 58 and the moving member main body 66 can be improved by the large diameter portion 64C. Due thereto, at the time when the moving member 64 is moved toward the axial direction distal end side, due to the pressure of the gas that is supplied from the MGG 60 to the inner side of the cylinder 58, the moving member 64 can efficiently move toward the axial direction distal end side, and the moving member 64 can efficiently rotate the rotating member 28 in the take-up direction, and the performance of the pretensioner 26 rotating the spool 18 in the take-up direction can be improved.

Moreover, at the time when the large diameter portion 64C is moved between the first facing plate 30A and the second facing plate 36A of the rotating member 28, movement of the large diameter portion 64C toward the axial direction distal end side is limited by the first facing plate 30A and the second facing plate 36A. Moreover, at the time when the stopper 92 is moved by the pushing pressure from the conical portion 70 of the moving member 64, the engaging force of the distal end portion 98 of the stopper 92 with the large diameter portion 64C can be made to be large. Due thereto, movement of the large diameter portion 64C toward the axial direction distal end side can be suppressed effectively.

Further, the large diameter portion 64C is provided only at the axial direction proximal end portion of the moving member 64. Therefore, even if the outer diameter dimension of the large diameter portion 64C is made to be the same as the inner diameter dimension of the cylinder 58, at the time when the moving member 64 is moved toward the axial direction distal end side, the sliding resistance of the moving member 64 with the cylinder 58 can still be made to be small, and the resistance to movement of the moving member 64 can still be reduced.

Moreover, the outer diameter dimensions of the medium diameter portion 64B and the border portion between the main body portion 64A and the large diameter portion 64C, of the moving member 64 gradually become larger while heading toward the axial direction proximal end side. Therefore, at the time when the moving member 64 is moved toward the axial direction distal end side, the medium diameter portion 64B can move smoothly with respect to the cylinder 58, the rotating member 28, the cover plate 50 and the guide member 82, and the border portion between the main body portion 64A and the large diameter portion 64C can move smoothly with respect to the cylinder 58.

Third Embodiment

A webbing retractor 200 relating to a third embodiment of the present invention is described next on the basis of FIG. 12B.

The webbing retractor 200 relating to the present embodiment has a structure substantially similar to the above-described second embodiment, but differs with respect to the following points.

As shown in FIG. 12B, at the moving member 64 of the webbing retractor 200 relating to the present embodiment, the axial direction dimensions of the main body portion 64A and the large diameter portion 64C of the moving member main body 66 are made to be small as compared with the above-described second embodiment, and the axial direction dimension of the medium diameter portion 64B of the moving member main body 66 is made to be large as compared with the above-described second embodiment.

The medium diameter portion 64B is made to be solid cylindrical. The outer diameter dimension of the medium diameter portion 64B is made to be small as compared with the outer diameter dimension of the main body portion 64A (the gap dimension between the first facing plate 30A and the second facing plate 36A of the rotating member 28), and is made to be large as compared with the outer diameter dimension of the small diameter portion 68 of the moving member 64. Further, the outer diameter dimension of the border portion between the medium diameter portion 64B and the main body portion 64A becomes gradually larger while heading toward the axial direction proximal end side of the moving member 64.

Here, also at the webbing retractor 200 relating to the present embodiment, operation and effects that are similar to those of the above-described second embodiment can be obtained.

In particular, the outer diameter dimension of the border portion between the main body portion 64A and the medium diameter portion 64B of the moving member 64 become gradually larger while heading toward the axial direction proximal end side. Therefore, at the time when the moving member 64 is moved toward the axial direction distal end side, the border portion between the main body portion 64A and the medium diameter portion 64B can move smoothly with respect to the cylinder 58, the rotating member 28, the cover plate 50 and the guide member 82.

Fourth Embodiment

A webbing retractor 300 relating to a fourth embodiment of the present invention is described next on the basis of FIG. 13 and FIG. 14.

The webbing retractor 300 relating to the present embodiment has a structure substantially similar to the above-described third embodiment, but differs with respect to the following points.

Figure 13:
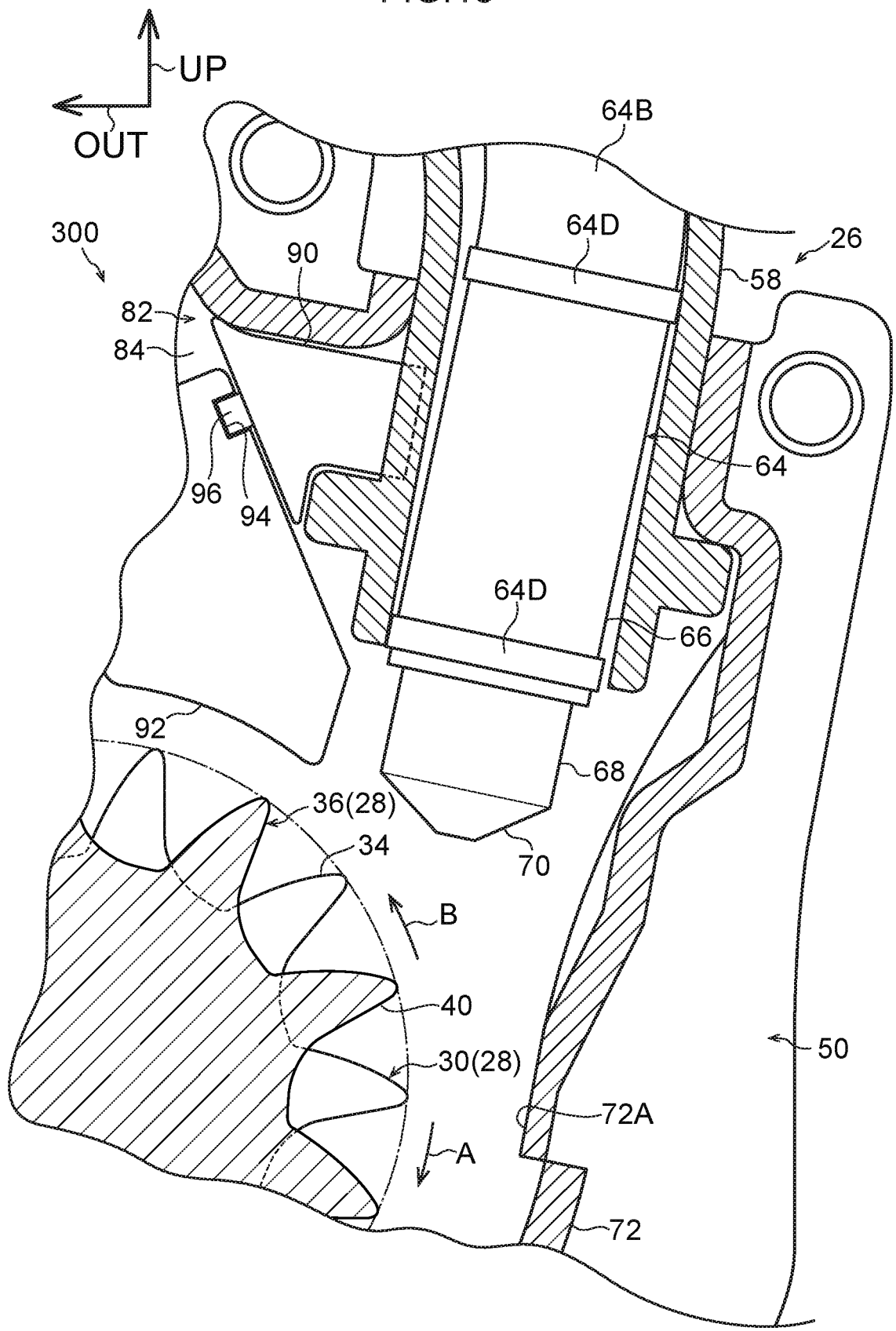
FIG. 13 is a side view in which the inner side of the cover plate is seen from the vehicle front side, at a webbing retractor relating to a fourth embodiment of the present invention.
Figure 14:
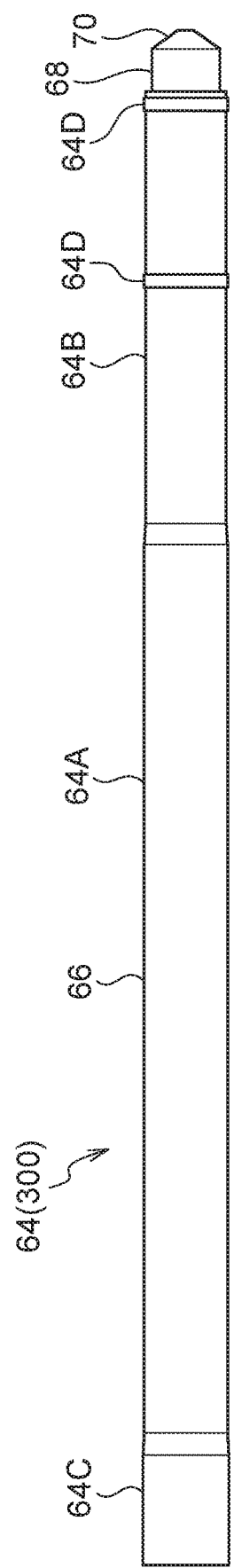
FIG. 14 is a side view of the moving member at the webbing retractor relating to the fourth embodiment of the present invention.

As shown in FIG. 13 and FIG. 14, at the webbing retractor 300 relating to the present embodiment, in the moving member main body 66 of the moving member 64, a pair of enlarged diameter portions 64D, which are solid cylindrical and serves as abutting portions, are formed at the main body portion 64A, coaxially therewith. The outer diameter dimensions of the enlarged diameter portions 64D are made to be large as compared with the outer diameter dimension of the portions, which are other than the enlarged diameter portions 64D, of the medium diameter portion 64B, and are made to be the same as the outer diameter dimension of the main body portion 64A (the gap dimension between the first facing plate 30A and the second facing plate 36A of the rotating member 28). The enlarged diameter portions 64D are disposed in a vicinity of the axial direction distal end and in a vicinity of the axial direction proximal end of the axial direction distal end side portion of the medium diameter portion 64B. The axial direction dimensions of the enlarged diameter portions 64D are made to be small as compared with the axial direction dimension of the conical portion 70 of the moving member 64.

The axial direction proximal end side portion of the medium diameter portion 64B is bent by a vicinity of the axial direction distal end portion of the cylinder 58, and the extending direction thereof is offset toward the vehicle transverse direction outer side and the vehicle front side while heading toward the axial direction distal end side. The axial direction distal end side portion of the medium diameter portion 64B, and the small diameter portion 68 and the conical portion 70 extend in a direction of heading toward the vehicle transverse direction outer side while heading toward the vehicle lower side.

The enlarged diameter portion 64D that is at the axial direction proximal end side of the medium diameter portion 64B, at the vehicle transverse direction inner side end portion thereof, abuts the vehicle transverse direction inner side end portion of the axial direction distal end portion inner peripheral surface of the cylinder 58. The enlarged diameter portion 64D that is at the axial direction distal end side of the medium diameter portion 64B, at the vehicle transverse direction outer side end portion thereof, abuts the vehicle transverse direction outer side end portion of the axial direction distal end portion inner peripheral surface of the cylinder 58. Due thereto, the central axis of the axial direction distal end side portion of the medium diameter portion 64B becoming offset, in the vehicle longitudinal direction and the vehicle transverse direction, with respect to the central axis of the axial direction distal end portion of the cylinder 58 is suppressed.

Here, also at the webbing retractor 300 relating to the present embodiment, operation and effects that are similar to those of the above-described third embodiment can be obtained.

Moreover, the enlarged diameter portions 64D of the medium diameter portion 64B of the moving member 64 about the inner peripheral surface of the axial direction distal end portion of the cylinder 58, and the central axis of the axial direction distal end side portion of the medium diameter portion 64B becoming offset, in the vehicle longitudinal direction and the vehicle transverse direction, with respect to the central axis of the axial direction distal end portion of the cylinder 58 is suppressed. Therefore, at the time when movement of the moving member 64 toward the axial direction distal end side is started, the central axis of the small diameter portion 68 and the conical portion 70 of the moving member 64 becoming offset, in the vehicle longitudinal direction and the vehicle transverse direction, with respect to the central axis of the axial direction distal end portion of the cylinder 58 can be suppressed, and the positions, at which the conical portion 70 and the small diameter portion 68 reach the first tooth 34 and the second tooth 40 of the moving member 28, becoming offset in the vehicle longitudinal direction and the vehicle transverse direction can be suppressed. Due thereto, the moving member 64 can suitably start the rotation of the rotating member 28 in the take-up direction, and the pretensioner 26 can appropriately start the rotation of the spool 18 in the take-up direction.

Further, the axial direction dimension of the enlarged diameter portions 64D of the medium diameter portion 64B are set to be small as compared with the axial direction dimension of the conical portion 70 of the moving member 64. Therefore, at the time when the moving member 64 is moved toward the axial direction distal end side, the sliding resistance of the moving member 64 with respect to the cylinder 58, the rotating member 28, the cover plate 50 and the guide member 82 can still be made small by the medium diameter portion 64B, and the resistance to movement of the moving member 64 can be reduced.

Note that, in the present embodiment, the two enlarged diameter portions 64D are provided at the medium diameter portion 64B of the moving member 64. However, one or three or more of the enlarged diameter portions 64D may be provided at the medium diameter portion 64B of the moving member 64.

Moreover, in the above-described first through fourth embodiments, the small diameter portion 68, the main body portion 64A and the large diameter portion 64C of the moving member 64 are made to be solid cylindrical. However, the outer diameter dimension of at least one of the small diameter portion 68, the main body portion 64A and the large diameter portion 64C of the moving member 64 may become gradually larger while heading toward the axial direction proximal end side of the moving member 64.

Further, in the above-described first embodiment through fourth embodiment, the outer diameter dimension of the border portion between the small diameter portion 68 and the moving member main body 66 of the moving member 64 may become gradually larger while heading toward the axial direction proximal end side of the moving member 64.

Moreover, in the above-described first embodiment through fourth embodiment, the small diameter portion 68 and the conical portion 70 are provided at the axial direction distal end portion of the moving member 64. However, the small diameter portion 68 only may be provided at the axial direction distal end portion of the moving member 64, and moreover, plural small diameter portions 68 that have different sectional surface areas in the direction orthogonal to the axis may be provided at the axial direction distal end portion of the moving member 64.

Further, in the above-described first embodiment through fourth embodiment, the cross-sections, in the direction orthogonal to the axis, of the small diameter portion 68 and the conical portion 70 are made to be circular. However, the cross-section, in the direction orthogonal to the axis, of at least one of the small diameter portion 68 and the conical portion 70 may be made to be a shape that has one of point symmetry and line symmetry, and moreover, the cross-section, in the direction orthogonal to the axis, of at least one of the small diameter portion 68 and the conical portion 70 may be made to be a shape that does not have point symmetry or line symmetry.

The disclosure of Japanese Patent Application No. 2017-150957 filed on Aug. 3, 2017 is, in its entirety, incorporated by reference into the present specification.

EXPLANATION OF REFERENCE NUMERALS

10 . . . webbing retractor, 18 . . . spool, 20 . . . webbing, 28 . . . rotating member, 30A . . . first facing plate (facing portion), 34 . . . first tooth (bite-in portion), 36A . . . second facing plate (facing portion), 40 . . . second tooth (bite-in portion), 58 . . . cylinder (guiding member), 64 . . . moving member, 66 . . . moving member main body (pierced portion), 68 . . . small diameter portion (pierced portion, narrow portion, first portion), 70 . . . conical portion (narrow portion, second portion), 100 . . . webbing retractor, 200 . . . webbing retractor, 300 . . . webbing retractor

The invention claimed is:

1. A webbing retractor comprising:
   a spool that is rotated in a take-up direction, and on which a webbing of a seatbelt device is taken up;
   a rotating member at which a bite-in portion is provided, and that is rotated toward one side such that the spool is rotated in the take-up direction;
   a moving member that, by being moved toward an axial direction distal end side and the bite-in portion biting thereinto, rotates the rotating member toward the one side; and
   a pierced portion that is provided at the moving member, the bite-in portion piercing an axial direction distal end side portion of the pierced portion and an axial direction proximal end side portion of the pierced portion such that the rotating member is rotated toward the one side, and the axial direction distal end side portion of the pierced portion being made to be small as compared with the axial direction proximal end side portion of the pierced portion in an entire circumference direction of the pierced portion such that a sectional surface area, in a direction orthogonal to an axis of the pierced portion, of the axial direction distal end side portion of the pierced portion is made to be small as compared with an axial direction proximal end side portion.

2. The webbing retractor of claim 1, comprising a narrow portion that is provided at the axial direction distal end portion of the moving member, and whose sectional surface area, in a direction orthogonal to an axis, is made to be small as compared with the axial direction proximal end side portion of the moving member, and a side surface of the narrow portion running along an axial direction of the moving member.

3. The webbing retractor of claim 1, comprising a narrow portion that is provided at the axial direction distal end portion of the moving member, and at which are provided a first portion, whose sectional surface area, in a direction orthogonal to the axis, is made to be small as compared with the axial direction proximal end side portion of the moving member, and, at an axial direction distal end side of the first portion, a second portion whose sectional surface area, in a direction orthogonal to the axis, is made to be small as compared with the first portion.

4. The webbing retractor of claim 2, wherein the narrow portion collides with a plurality of the bite-in portions.

5. The webbing retractor of claim 2, comprising a pair of facing portions that are provided at the rotating member so as to face one another, the bite-in portion being disposed between the pair of facing portions, and the narrow portion being disposed between the pair of facing portions before the moving member is moved toward the axial direction distal end side.

6. The webbing retractor of claim 2, wherein a cross-section, in the direction orthogonal to the axis, of the narrow portion is made to be a shape that has at least one of point symmetry or line symmetry.

7. The webbing retractor of claim 1, comprising a pair of facing portions that are provided at the rotating member so as to face one another, and between which the bite-in portion is disposed, and before the moving member is moved toward the axial direction distal end side, the axial direction proximal end side portion of the pierced portion being made to be a dimension so as to fit together therebetween and the axial direction distal end side portion of the pierced portion being made to be a dimension so as not to fit together therebetween.

8. The webbing retractor of claim 7, wherein, even if the rotating member is displaced before the moving member is moved toward the axial direction distal end side, separation between the axial direction distal end side portion of the pierced portion and the pair of facing portions is maintained.

9. The webbing retractor of claim 1, comprising a guiding member that can guide the moving member to the rotating member side, and before the moving member is moved toward the axial direction distal end side, the axial direction proximal end side portion of the pierced portion being made to be a dimension so as to fit together therewith and the axial direction distal end side portion of the pierced portion being made to be a dimension so as not to fit together therewith.

10. The webbing retractor of claim 1, wherein the sectional surface area, in the direction orthogonal to the axis, of the pierced portion becomes smaller in a plurality of steps while heading toward an axial direction distal end side.

11. The webbing retractor of claim 3, wherein the narrow portion collides with a plurality of the bite-in portions.

12. The webbing retractor of claim 3, comprising a pair of facing portions that are provided at the rotating member so as to face one another, the bite-in portion being disposed between the pair of facing portions, and the narrow portion being disposed between the pair of facing portions before the moving member is moved toward the axial direction distal end side.

13. The webbing retractor of claim 3, wherein a cross-section, in the direction orthogonal to the axis, of the narrow portion is made to be a shape that has at least one of point symmetry or line symmetry.

* * * * *